(12) United States Patent
Kim et al.

(10) Patent No.: US 12,445,820 B2
(45) Date of Patent: Oct. 14, 2025

(54) ELECTRONIC DEVICE FOR DETERMINING APPLICATION CONTROLLING EXTERNAL ELECTRONIC DEVICE AND METHOD FOR OPERATING THE SAME

(71) Applicant: Samsung Electronics Co., Ltd., Suwon-si (KR)

(72) Inventors: Namjin Kim, Suwon-si (KR); Sungmi Park, Suwon-si (KR); Moohyun Shin, Suwon-si (KR); Sanghoon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 17/975,143

(22) Filed: Oct. 27, 2022

(65) Prior Publication Data

US 2023/0127435 A1 Apr. 27, 2023

Related U.S. Application Data

(63) Continuation of application No. PCT/KR2022/016499, filed on Oct. 26, 2022.

(30) Foreign Application Priority Data

Oct. 27, 2021 (KR) .......................... 10-2021-0144688
Nov. 23, 2021 (KR) .......................... 10-2021-0162312

(51) Int. Cl.
*H04W 4/50* (2018.01)
*G06K 7/10* (2006.01)
(Continued)

(52) U.S. Cl.
CPC .......... *H04W 4/50* (2018.02); *G06K 7/10722* (2013.01); *G06K 7/1417* (2013.01); *H04W 8/24* (2013.01); *H04W 12/069* (2021.01)

(58) Field of Classification Search
CPC ....... H04W 4/50; H04W 12/069; H04W 8/24; G06K 7/10722; G06K 7/1417
(Continued)

(56) References Cited

U.S. PATENT DOCUMENTS 9,774,604 B2 9/2017 Zou et al.
2014/0173082 A1* 6/2014 Shin ........................ H04L 67/06
709/223

(Continued)

FOREIGN PATENT DOCUMENTS

JP 2007-043396 A 2/2007
KR 10-2014-0022254 A 2/2014
(Continued)

OTHER PUBLICATIONS

Intents and Intent Filters; The Wayback Machine—https://web.archive.org/web/20200925005507/https://developer; Sep. 25, 2020.
(Continued)

*Primary Examiner* — Michael R Neff
(74) *Attorney, Agent, or Firm* — Jefferson IP Law, LLP

(57) ABSTRACT

According to an embodiment, an electronic device includes a communication circuit and at least one processor connected to the communication circuit. The at least one processor is configured to obtain onboarding information of an external electronic device, identify whether a first application is installed in the electronic device, in response to the first application being installed in the electronic device, execute the first application and determine a second application to control the external electronic device independently from the first application based on the onboarding information about the external electronic device, and in response to the first application not being installed in the electronic device, receive a list of applications capable of controlling the external electronic device from a server and (Continued)

determine the second application to control the external electronic device based on the application list.

13 Claims, 16 Drawing Sheets

(51) Int. Cl.
  *G06K 7/14* (2006.01)
  *H04W 8/24* (2009.01)
  *H04W 12/069* (2021.01)

(58) Field of Classification Search
  USPC .......................................................... 455/420
  See application file for complete search history.

(56) References Cited

U.S. PATENT DOCUMENTS

| | | | |
|---|---|---|---|
| 2015/0130957 A1* | 5/2015 | Berelejis | H04L 12/2807 348/211.1 |
| 2015/0288748 A1* | 10/2015 | Oh | H04L 67/10 709/203 |
| 2015/0317467 A1 | 11/2015 | Rattner et al. | |
| 2016/0216955 A1 | 7/2016 | Kwon et al. | |
| 2016/0330266 A1* | 11/2016 | Bakhmutov | H04L 67/104 |
| 2016/0371124 A1 | 12/2016 | Kim et al. | |
| 2017/0006471 A1* | 1/2017 | Kim | H04W 12/06 |
| 2017/0180149 A1 | 6/2017 | Mcconnell et al. | |
| 2019/0306147 A1* | 10/2019 | Uhr | H04L 9/3263 |
| 2021/0075693 A1 | 3/2021 | Su et al. | |
| 2021/0400477 A1 | 12/2021 | Choi et al. | |

FOREIGN PATENT DOCUMENTS

| | | |
|---|---|---|
| KR | 10-2016-0082620 A | 7/2016 |
| KR | 10-2016-0086332 A | 7/2016 |
| KR | 10-2016-0091663 A | 8/2016 |
| KR | 10-2016-0146732 A | 12/2016 |
| KR | 10-2016-0149922 A | 12/2016 |
| KR | 10-1690968 B1 | 12/2016 |
| KR | 10-2019-0001138 A | 1/2019 |
| KR | 10-2020-0050674 A | 5/2020 |
| KR | 10-2020-0112433 A | 10/2020 |

OTHER PUBLICATIONS

Extended European Search Report dated Sep. 30, 2024, issued in European Application No. 22887621.5-1206.
International Search Report dated Jan. 20, 2023, issued in International Patent Application No. PCT/KR2022/016499.

* cited by examiner

ELECTRONIC DEVICE FOR DETERMINING APPLICATION CONTROLLING EXTERNAL ELECTRONIC DEVICE AND METHOD FOR OPERATING THE SAME

CROSS-REFERENCE TO RELATED APPLICATION(S)

This application is a continuation application, claiming priority under § 365(c), of an International application No. PCT/KR2022/016499, filed on Oct. 26, 2022, which is based on and claims the benefit of a Korean patent application number 10-2021-0144688, filed on Oct. 27, 2021, in the Korean Intellectual Property Office, and of a Korean patent application number 10-2021-0162312, filed on Nov. 23, 2021, in the Korean Intellectual Property Office, the disclosure of each of which is incorporated by reference herein in its entirety.

TECHNICAL FIELD

The disclosure relates to an electronic device and a method for operating the same, which determine an application capable of controlling an external electronic device.

BACKGROUND ART

The Internet of Things (IoT) refers to technology for accessing the Internet by equipping various things with sensors and communication functionality.

IoT is an artificial intelligence technology capable of exchanging data between things connected via the Internet, self-analyzing the data, providing learned information to the user or allowing the user to remotely control them. The things may be various embedded systems, e.g., home appliances, mobile devices, or wearable devices. IoT-connected things may connect to the Internet using their own unique IP addresses for distinguishing them from others and may have sensors for obtaining data from an external environment.

IoT is also highly useful for the purpose of controlling various electronic devices in the home. The user may control electronic devices, such as a TV, a washing machine, or an air conditioner, to perform their respective specialized services in the home IoT environment and may easily share information thereabout.

The above information is presented as background information only to assist with an understanding of the disclosure. No determination has been made, and no assertion is made, as to whether any of the above might be applicable as prior art with regard to the disclosure.

DISCLOSURE

Technical Problem

The user may select an application to connect an electronic device to a cloud and control it and may connect and control the electronic device using the application. To connect and control the electronic device using the applications provided from different manufacturers, the user may control the electronic device via cloud-to-cloud interactions. For cloud-to-cloud interactions, interfaces need to be matched between the different manufacturers, and authority for access to a corresponding cloud needs to be given through a separate authentication process.

Aspects of the disclosure are to address at least the above-mentioned problems and/or disadvantages and to provide at least the advantages described below. Accordingly, an aspect of the disclosure is to provide an electronic device that determines an application capable of registering an external electronic device with cloud and grant an application of another manufacturer/platform an administration authority capable of the external electronic device.

Technical Solution

Embodiments of the disclosure are not limited to the foregoing objectives, and other objectives would readily be appreciated by a skilled artisan from the following detailed description taken in conjunction with the accompanying drawings.

In accordance with an aspect of the disclosure, an electronic device includes a communication circuit and at least one processor connected to the communication circuit. The at least one processor may be configured to obtain onboarding information about an external electronic device, identify whether a first application is installed on the electronic device, when the first application is installed on the electronic device, execute the first application and determine a second application to control the external electronic device independently from the first application based on the onboarding information about the external electronic device, and when the first application is not installed on the electronic device, receive a list of applications capable of controlling the external electronic device from a server and determine the second application to control the external electronic device based on the application list.

In accordance with another aspect of the disclosure, an electronic device includes a communication circuit and at least one processor connected to the communication circuit. The at least one processor may be configured to obtain onboarding information about an external electronic device, receive, from a server, priority information about an application executable on the electronic device, determine an application for controlling the external electronic device based on the priority information about the application and the onboarding information about the external electronic device, and execute the application.

Advantageous Effects

According to various embodiments, the electronic device may efficiently determine the application capable of registering an external electronic device with cloud based on the priority and the characteristics of the external electronic device.

According to various embodiments, the electronic device may grant an administration authority for controlling an external electronic device to applications of other manufacturers/platforms.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
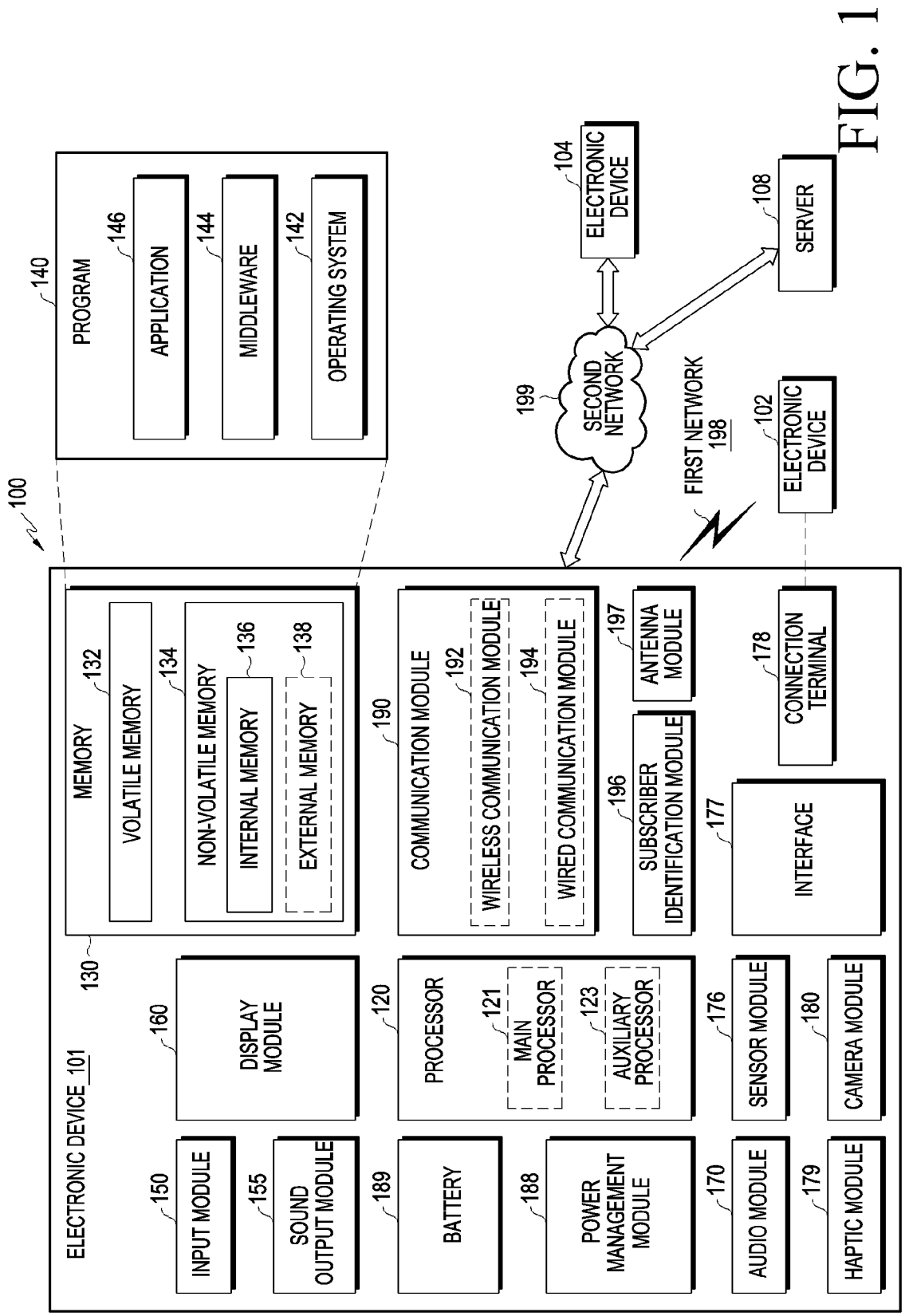
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
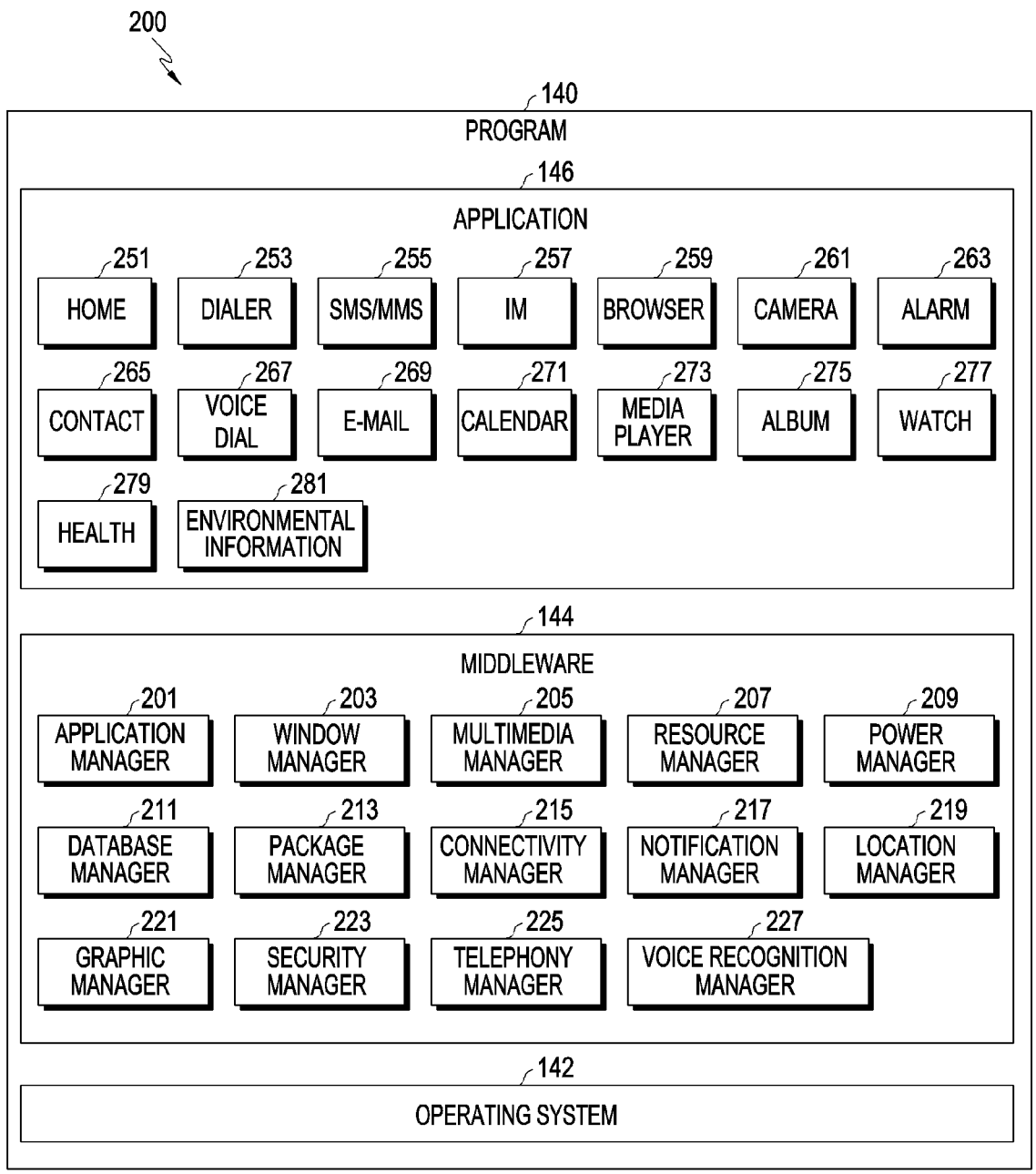
FIG. 2 is a block diagram illustrating an example of a program according to an embodiment of the disclosure.

FIG. 2 is a block diagram illustrating the program according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MIMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
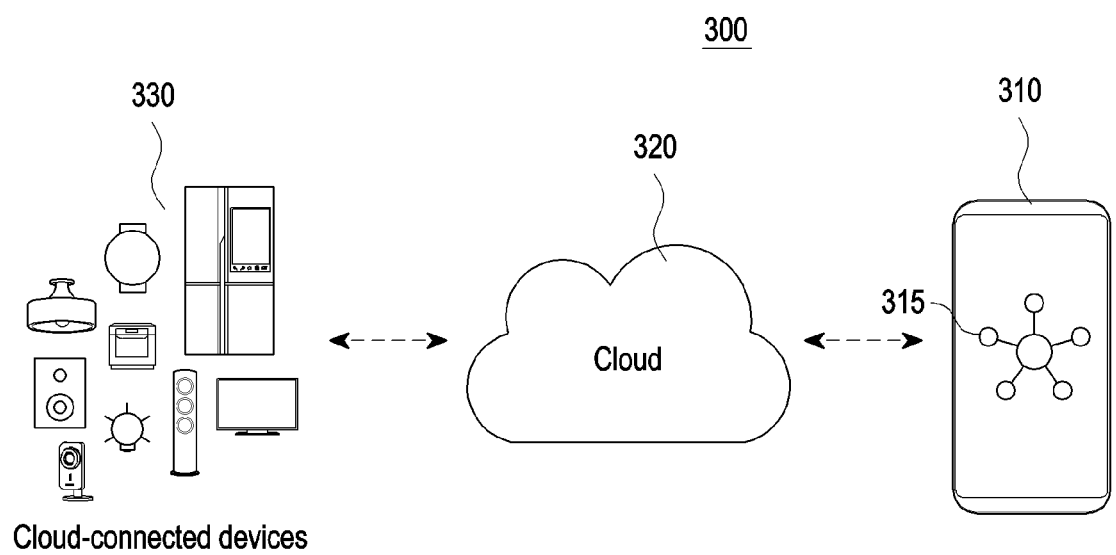
FIG. 3 is a view illustrating an example of an IoT environment according to an embodiment of the disclosure.

FIG. 3 is a view illustrating an example of an IoT environment according to an embodiment of the disclosure.

Referring to FIG. 3, an IoT environment 300 may include an electronic device 310, a cloud 320, and cloud-connected devices 330. According to various embodiments, the IoT environment 300 may mean a type of platform that connects cloud-connected devices 330, e.g., home appliances, via various types of communication networks and relays and controls them by a local server. According to various embodiments, the IoT environment 300 may provide device search and control while controlling various communication protocols, such as Bluetooth (BT), Bluetooth low energy (BLE), Wi-Fi, peer-to-peer (P2P) network, universal plug and play (UPnP), Cloud, or ultra-wideband (UWB). According to various embodiments, the IoT environment 300 may be implemented as an open platform to be able to connect not only a specific brand of sensor or product but also other brands of products. According to various embodiments, the IoT environment 300 may be implemented as a closed platform to be able to connect a specific brand of sensor and product.

According to various embodiments, an application 315 (e.g., the application 146 of FIG. 1) executable by an operating system (e.g., the OS 142 of FIG. 1) may be installed on the electronic device 310 (e.g., the electronic device 101 of FIG. 1). According to various embodiments, the application 315 may be preloaded on the electronic device 310 when manufactured or be downloaded from an external electronic device (e.g., the electronic device 102 or 104 of FIG. 1 or the server 108 of FIG. 1) or updated. According to various embodiments, the application 315 may identify the state of the cloud-connected devices 330 registered with the server in the cloud 320 and control the cloud-connected devices 330. According to various embodiments, the application 315 may control the cloud-connected devices 330 registered with the server in the cloud 320 to be automatically operated at a predetermined time or receive notifications from the cloud-connected devices 330. According to various embodiments, the application 315 may control and manage smart home appliances or Internet of Things (IoT) through the electronic device 310 and wiredly or wirelessly connect with nearby devices. For example, the cloud-connected devices 330 may include at least one of TVs, speakers, refrigerators, kimchi refrigerators, wine cellars, washers, driers, air dressers, ovens, dish washers, cooktops, robot vacuums, air conditioners, and air purifiers.

Figure 4:
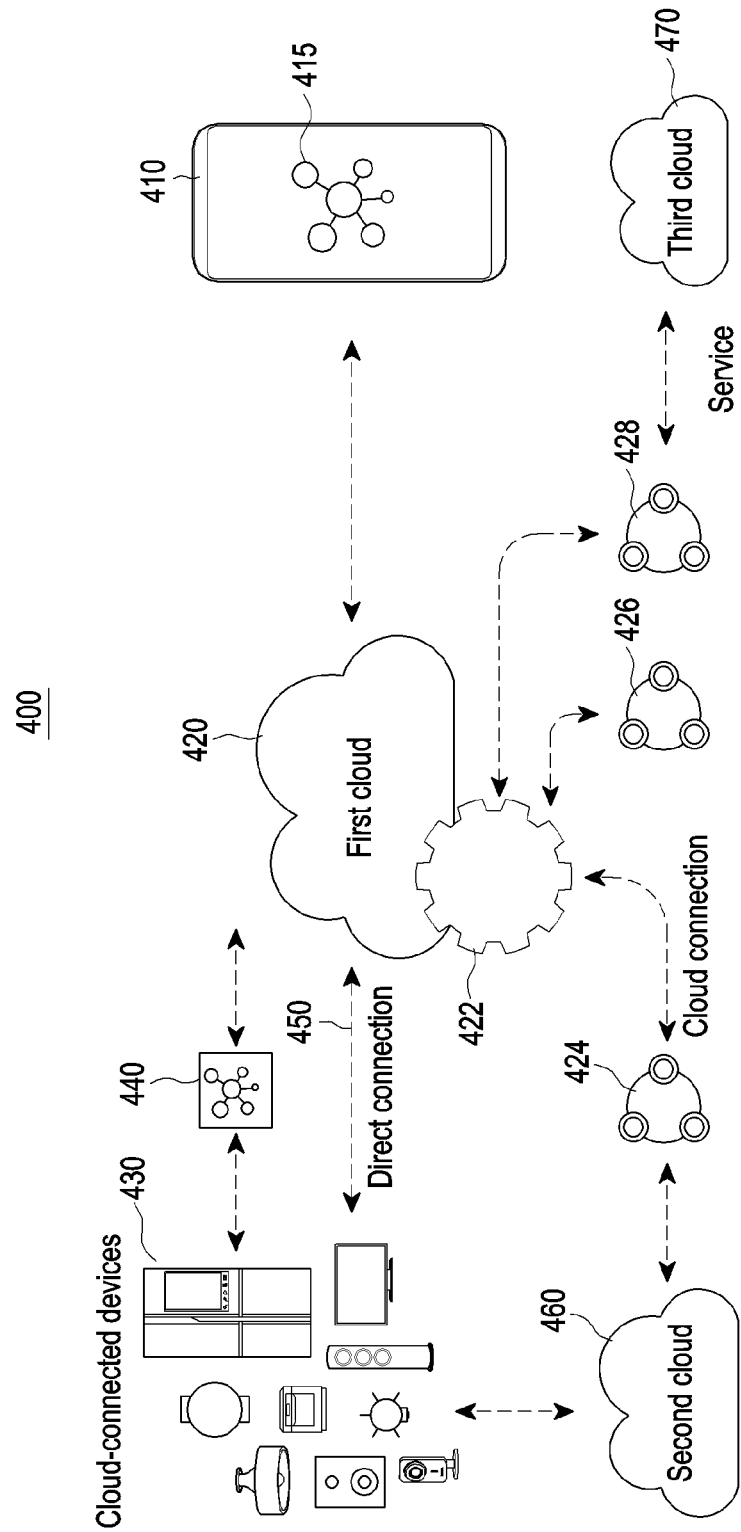
FIG. 4 is a view illustrating another example of an IoT environment according to an embodiment of the disclosure.

FIG. 4 is a view illustrating another example of an IoT environment according to an embodiment of the disclosure.

Referring to FIG. 4, an IoT environment 400 may include an electronic device 410, a first cloud 420, cloud-connected devices 430 (e.g., the cloud-connected devices 330 of FIG. 3), a hub 440, a second cloud 460, and/or a third cloud 470. According to various embodiments, the IoT environment 400 may provide substantially the same or similar environment to the IoT environment 300 described in connection with FIG. 3. According to various embodiments, an application 415 (e.g., the application 146 of FIG. 1) executable by an operating system (e.g., the OS 142 of FIG. 1) may be installed on the electronic device 410 (e.g., the electronic device 101 of FIG. 1). According to various embodiments, the application 415 may mean a client application that registers the cloud-connected devices 430 with the first cloud 420 and may remotely control the registered devices. According to various embodiments, the application 415 may identify the state of the cloud-connected devices 430 registered with the server in the first cloud 420 and may control the cloud-connected devices 430. According to various embodiments, the application 415 may control the cloud-connected devices 430 registered with the server in the first cloud 420 to be automatically operated at a predetermined time or may receive notifications from the cloud-connected devices 430. According to various embodiments, the application 415 may control and manage smart home appliances or Internet of Things (IoT) through the electronic device 310 and may wiredly or wirelessly connect with nearby devices.

According to various embodiments, the device connectable to the first cloud 420 may be connected to the first cloud 420 in the type of hub-connected 440, direct-connected 450, or cloud-connected 424 or 428. According to various embodiments, the first cloud 420 may include a server that manages or controls the electronic device 410 and the cloud-connected devices 430. According to various embodiments, the server in the first cloud 420 may store information transmitted/received between the electronic device 410 and the cloud-connected devices 430, may relay communication between the electronic device 410 and the cloud-connected devices 430, and support communication of the electronic device 410 and the cloud-connected devices 430. According to various embodiments, the first cloud 420 may implement an application programming interface (API) which is a language or message format used for communication between operating system and application program. According to various embodiments, the first cloud 420 may be connected with the cloud-connected devices 430 via the hub 440. According to various embodiments, the hub 440 may connect the first cloud 420 and the cloud-connected devices 430 through a communication function, such as ZigBee, Zwave, LAN, or Matter. According to various embodiments, the hub 440 may mean a device (e.g., gateway) that relays communication between the first cloud 420 and the cloud-connected devices 430. According to various embodiments, the hub 440 may be a device implemented in the first cloud 420 or implemented as a separate device (e.g., external server).

According to various embodiments, the first cloud 420 may be connected with the cloud-connected devices 430 via direct connection 450 without using the hub 440. According to various embodiments, at least one of the cloud-connected device 430 may be directly connected to a Wi-Fi AP and be connected to the first cloud 420.

According to various embodiments, the first cloud 420 may be connected with the cloud connector 424 using the API 422 and communicate with the second cloud 460. According to various embodiments, the operator who provides service on the first cloud 420 may differ from the operator who provides service on the second cloud 460. According to various embodiments, the cloud connector 424 may relay communication between different clouds (e.g., the first cloud 420 and the second cloud 460). According to various embodiments, the cloud connector 424 may be a hardware device or software module implemented in the first cloud 420. According to various embodiments, the cloud connector 424 may be a hardware device or software module implemented outside the first cloud 420. According to various embodiments, the cloud connector 424 may be a separate server implemented outside the first cloud 420.

According to various embodiments, the first cloud 420 may be connected with an automation function 426 using the API 422. The automation function 426 may control each of the cloud-connected devices 430 connected to the first cloud 420 to perform its defined operation without a user command (or input) in a case in which a condition set in the application 415 by the user is met. According to various embodiments, the automation function 426 may be a hardware device or software module implemented in the first cloud 420. According to various embodiments, the automation function 426 may be a hardware device or software module implemented outside the first cloud 420. According to various embodiments, the automation function 426 may be a separate server implemented outside the first cloud 420. According to various embodiments, in response to a user input, the application 415 may set various conditions, e.g., time (e.g., specific time, specific time period, always, or day), device state, member location (e.g., check on whether it is in the initially set place), place state, or weather. According to various embodiments, in a case in which the condition set by the application 415 is met, the automation function 426 may control the cloud-connected devices 430 connected to the first cloud 420 to perform functions, e.g., device control, smartphone notification, play voice messages through speaker, place state change, or mode execution.

According to various embodiments, the first cloud 420 may be connected with the cloud connector 428 using the API 422 and communicate with the third cloud 470. According to various embodiments, the operator who provides service on the first cloud 420 may differ from the operator who provides service on the third cloud 470. According to various embodiments, the cloud connector 428 may relay communication between different clouds (e.g., the first cloud 420 and the third cloud 470). According to various embodiments, the cloud connector 428 may be a hardware device or software module implemented in the first cloud 420. According to various embodiments, the cloud connector 428 may be a hardware device or software module implemented outside the first cloud 420. According to various embodiments, the cloud connector 428 may be a separate server implemented outside the first cloud 420.

According to various embodiments, the cloud-connected devices 430, which are connected to the first cloud 420 via hub-connected 440, direct-connected 450, or cloud-connected 424 or 428, in a case in which authentication is completed, may be onboarded (or registered) to the first cloud 420 through the application 415. According to various embodiments, onboarding may be a process of registering at least one electronic device with the first cloud 420 through the application 415.

Figure 5:
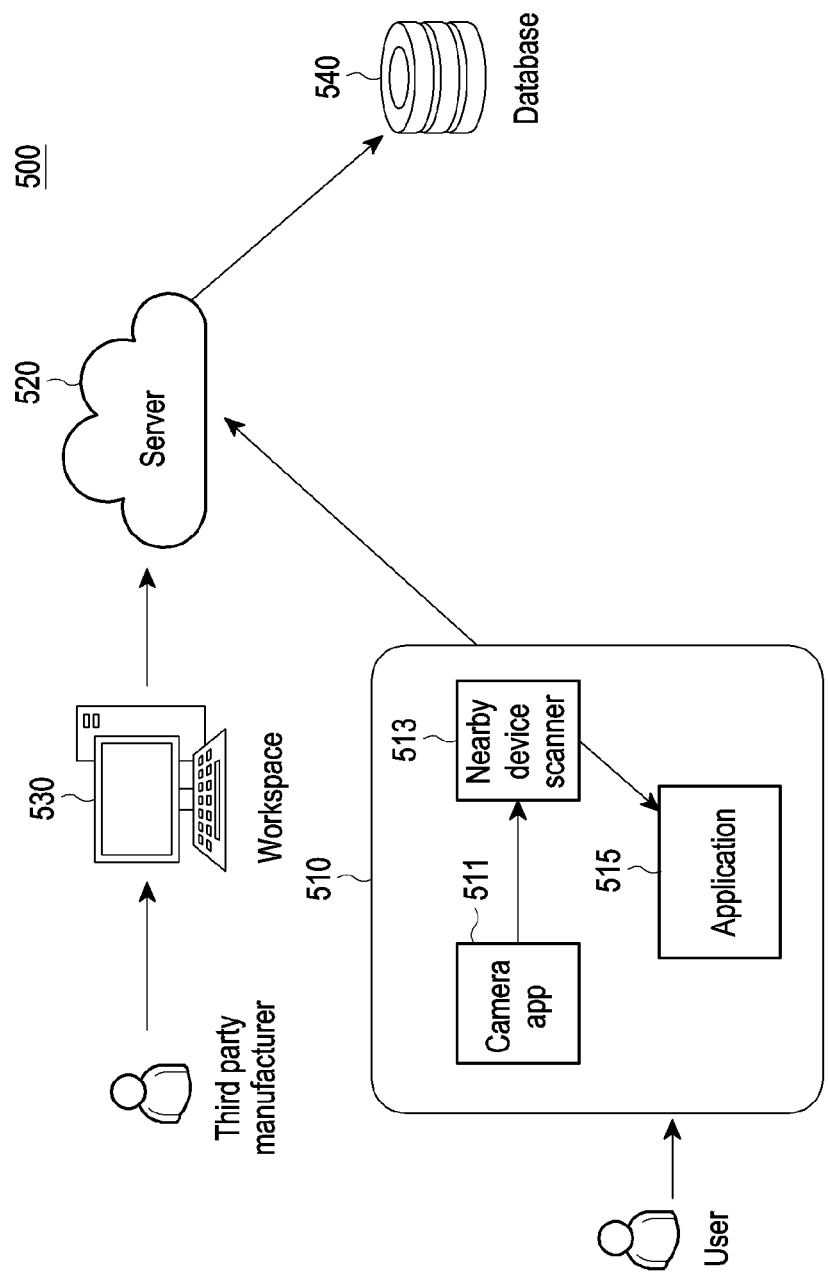
FIG. 5 is a view illustrating another example of an IoT environment according to an embodiment of the disclosure.

FIG. 5 is a view illustrating another example of an IoT environment according to an embodiment of the disclosure.

Referring to FIG. 5, an IoT environment 500 may include an electronic device 510, a server 520, a workspace 530, and/or a database (DB) 540. According to various embodiments, the IoT environment 500 may provide substantially the same or similar environment to the IoT environment 300 described in connection with FIG. 3 or the IoT environment 400 described in connection with FIG. 4. According to various embodiments, an application 515 (e.g., the application 146 of FIG. 1) executable by an operating system (e.g., the OS 142 of FIG. 1) may be installed on the electronic device 510 (e.g., the electronic device 101 of FIG. 1).

According to various embodiments, the electronic device 510 may include a camera app (camera application) 511, a nearby device scanner (NDS) 513, and/or an application 515. According to various embodiments, the camera app 511 may recognize (or identify) a QR code of at least one external electronic device to be onboarded. According to various embodiments, the camera app 511 may parse the QR code to allow the user to identify (or determine) whether to onboard at least one external electronic device. According to various embodiments, the application 515 may mean a client application that registers at least one external electronic device with a server 520 in the cloud and may remotely control the registered devices. According to various embodiments, the application 515 may identify the state of at least one external electronic device registered with the server 520 in the cloud and may control the at least one external electronic device. According to various embodiments, the nearby device scanner 513, as a nearby device scanner service module, may scan at least one external electronic device in the background. According to various embodiments, the nearby device scanner 513 may detect (or sense) at least one external electronic device capable of onboarding. According to various embodiments, the nearby device scanner 513 may determine the priority of an application for performing (or controlling) onboarding and may provide a function to execute the application. According to various embodiments, the electronic device 510 may obtain onboarding information about at least one external electronic device using the camera app 511 and/or the nearby device scanner 513. According to various embodiments, the onboarding information about at least one external electronic device may include a manufacturer ID (vendorid) of at least one external electronic device and an ID (productid) of the at least one external electronic device registered with the workspace 530. According to various embodiments, the electronic device 510 may transmit the onboarding information about at least one external electronic device to the server 520. According to various embodiments, the electronic device 510 may store and use information about the priority of the application for performing (or controlling) onboarding. According to various embodiments, the information about the priority of the application may include information about the priority of granting an administration authority to a manufacturer/platform different from that of the electronic device (or external electronic device).

According to various embodiments, the electronic device 510 may determine the type of the application 415 to control at least one external electronic device based on the onboarding information about at least one external electronic device that includes a manufacturer ID (vendorid) of at least one external electronic device and an ID (productid) of the at least one external electronic device registered with the workspace 530. According to various embodiments, the electronic device 510 may determine the type of the application to control at least one external electronic device based on the manufacturer ID (vendorid) of the at least one external electronic device, the ID (productid) of the at least one external electronic device registered with the workspace 530, and the information regarding the application priority. According to various embodiments, the application priority may be determined based on the type (e.g., Galaxy, Non-Galaxy, Android, or iOS) of the operating system (mobile OS) installed on the electronic device 510 and information (e.g., whether SmartThings app is installed, or whether Google Home app is installed) regarding the application installed on the electronic device 510. According to various embodiments, the electronic device 510 may previously store an application list capable of onboarding at least one external electronic device or may receive an application list from the server 520. According to various embodiments, the electronic device 510 may automatically recommend an application for onboarding according to the application list or may display a list of possible applications.

According to various embodiments, the workspace 530 may also be referred to as a developer workspace, and the developer of each product may transmit information regarding the type, feature, and/or device serial number of the product to the server. According to various embodiments, a third party manufacturer may transmit, to the server 520, the information regarding the type, feature, and/or device serial number of the product using its product (or at least one external electronic device) to the workspace 530. According to various embodiments, the database 540 may receive and store the onboarding information about the at least one external electronic device from the server 520. According to various embodiments, the database 540 may store at least one of application type information (partner name), the manufacturer ID (vendorid) of at least one external electronic device, the ID (productid) of at least one external electronic device registered with the workspace 530, and information regarding the application link (app link) according to the application type. According to various embodiments, the database 540 may provide the stored information to the server 520 according to a request of the server 520. According to various embodiments, the information stored in the database 540 may be provided to the electronic device 510 through the server 520.

According to various embodiments, the disclosure proposes a method for determining an application capable of onboarding (or registering) an external electronic device based on priority and granting an administration authority capable of controlling the external electronic device to an application of another manufacturer/platform. According to various embodiments, the disclosure may obtain onboarding information about the external electronic device through QR code recognition or nearby device scanning and determine (or select) an application according to priority.

According to various embodiments, in a case in which the initial application onboarding (or registering) the external electronic device is an application of the manufacturer of the external electronic device (or electronic device), an administration authority for controlling the external electronic device may be added to the application of the other manufacturer/platform. According to various embodiments, the application of the manufacturer of the external electronic device (or electronic device) may directly grant an administration authority to the application of the other manufacturer/platform. According to various embodiments, after the application of the other manufacturer/platform is executed, the application of the other manufacturer/platform may directly update the administration authority for the external electronic device. According to various embodiments, the application of the manufacturer of the external electronic device (or electronic device) may directly provide an administration authority to the user in a specific location through an invite function.

In the disclosure, for convenience of description, the application of the manufacturer of the external electronic device (or electronic device) may be referred to as a "first application", and the application of the other manufacturer/platform may be referred to as a "second application."

Figure 6A:
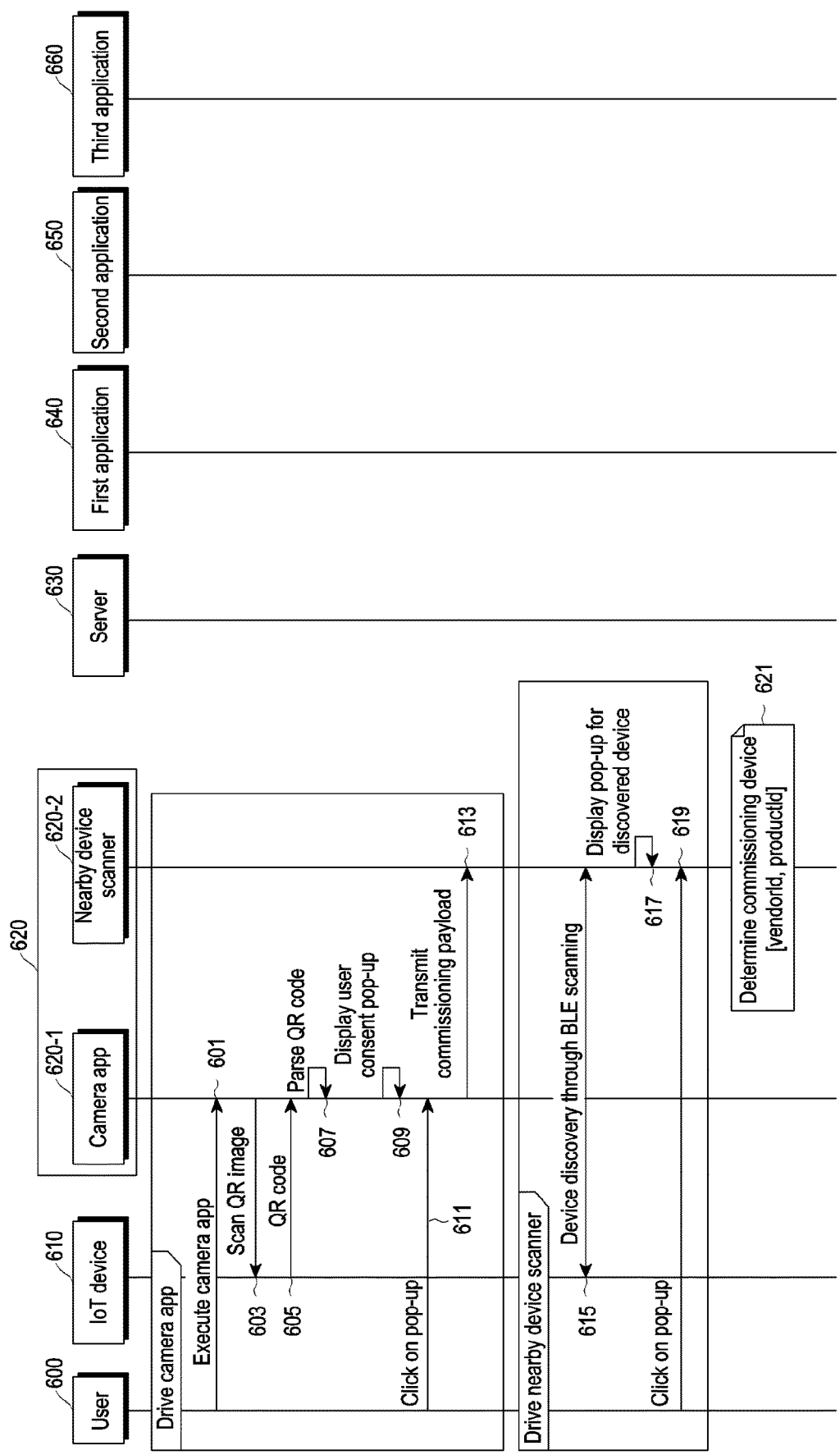
FIGS. 6A, 6B, and 6C are flowcharts illustrating operations of an electronic device according to various embodiments of the disclosure.
Figure 6B:
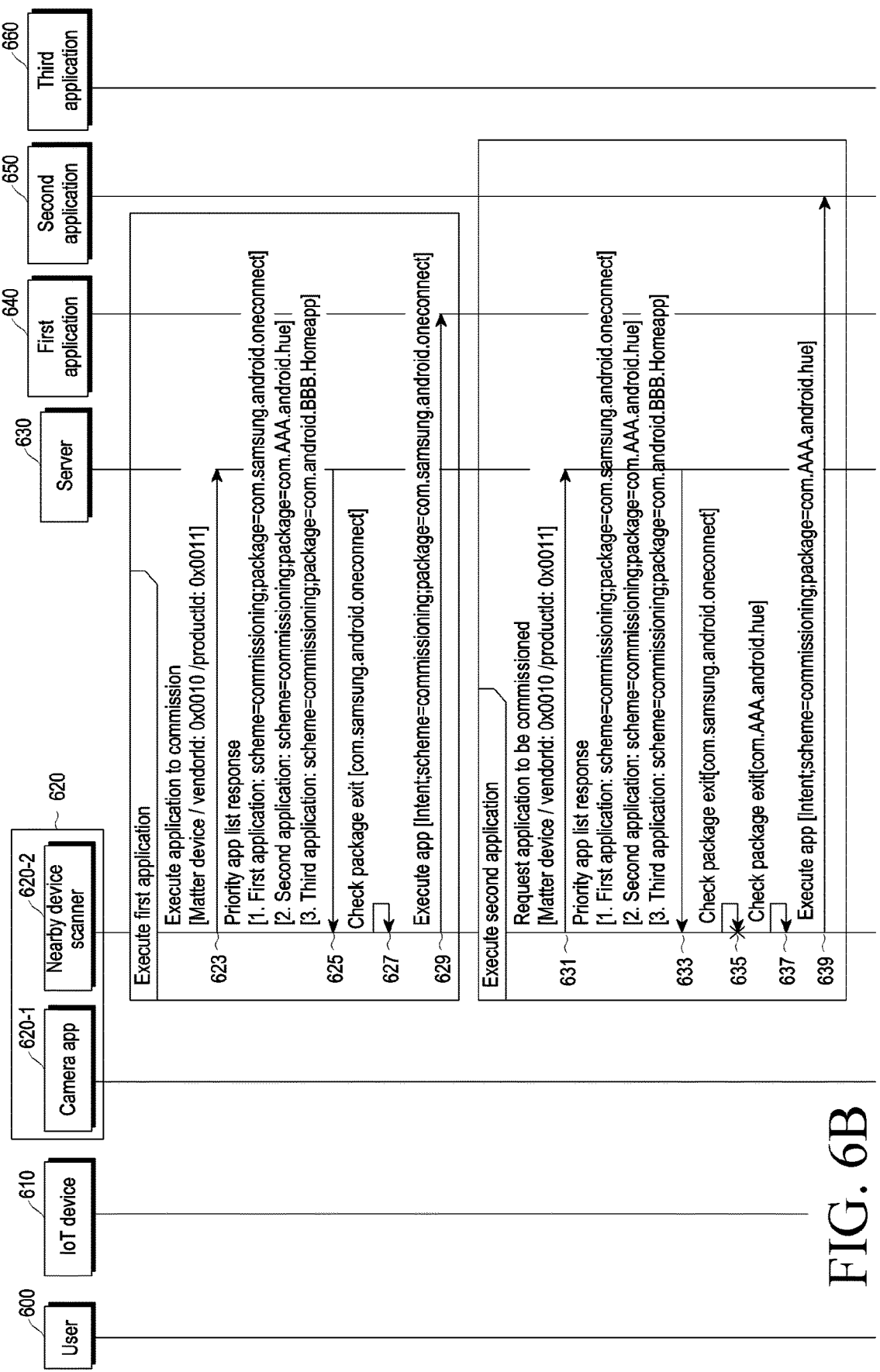
Figure 6C:
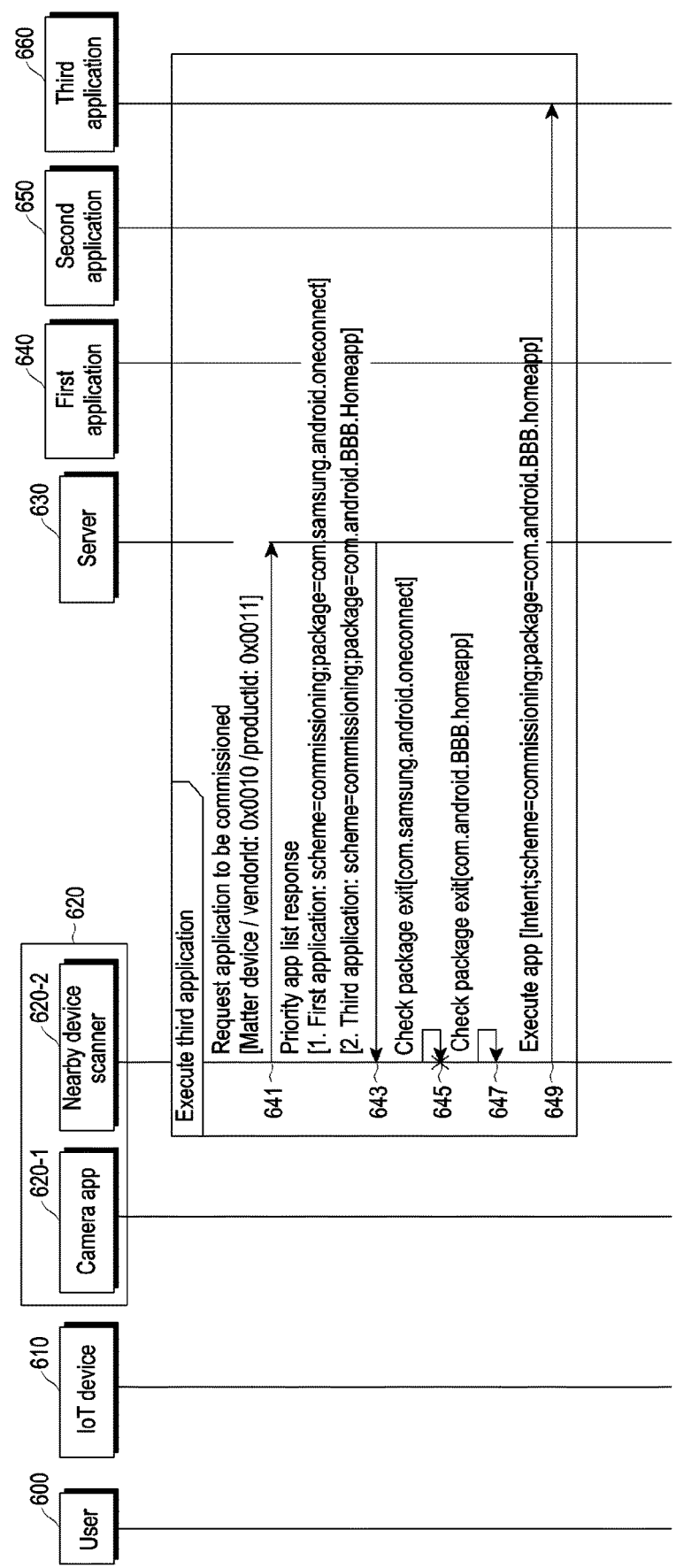

FIGS. 6A to 6C are flowcharts illustrating operations of an electronic device according to various embodiments of the disclosure.

Referring to FIGS. 6A to 6C, a system may include an IoT device 610, an electronic device 620, a server 630, a first application 640, a second application 650, and/or a third application 660. According to various embodiments, the IoT device 610 may be implemented as any one of the electronic device 102 or 104 of FIG. 2, the cloud-connected devices 330 of FIG. 3, or the cloud-connected devices 430 of FIG. 4.

According to various embodiments, the electronic device 620 may include a camera app 620-1 (e.g., the camera app 511 of FIG. 5) and/or a nearby device scanner 620-2 (e.g., the nearby device scanner 513 of FIG. 5). According to various embodiments, the server 630 may mean a server for onboarding (or registering) the IoT device 610 to control the IoT device 610 through the electronic device 620. According to various embodiments, the server 630 may correspond to each of the first application 640, the second application 650, and the third application 660. For convenience of description, the server 630 is illustrated as one server, but the technical spirit of the disclosure is not limited thereto, and the server 630 may include three independent servers corresponding to the first application 640, the second application 650, and the third applications 660, respectively. According to various embodiments, the first application 640, the second application 650, and the third application 660 may communicate with their respective corresponding servers to support onboarding of the IoT device 610. According to various embodiments, each of the first application 640, the second application 650, and the third application 660 may be independently managed by a different product manufacturer or server operator. According to various embodiments, the first application 640, the second application 650, and the third application 660 may communicate with each other through corresponding server-to-server communication or cloud connection.

Referring to FIG. 6A, when the user 600 runs the camera app 620-1, the user 600 may execute the camera app 620-1 in operation 601. According to various embodiments, the camera app 620-1 may scan a QR code image for the IoT device 610 based on a user command in operation 603. According to various embodiments, the IoT device 610 may provide QR code information to the camera app 620-1 in operation 605, and the camera app 620-1 may parse the QR code in operation 607. According to various embodiments, the camera app 620-1 may display a user consent popup in operation 609. According to various embodiments, when the user 600 clicks on the pop-up through the camera app 620-1 in operation 611, the camera app 620-1 may transmit a commissioning payload to the nearby device scanner 620-2 in operation 613.

According to various embodiments, when the user 600 drives the nearby device scanner 620-2, the nearby device scanner 620-2 may perform device discovery on the IoT device 610 through short-range communication in operation 615. According to various embodiments, the nearby device scanner 620-2 may perform device discovery on the IoT device 610 using short-range communication, such as BLE scanning, Wi-Fi, Bluetooth, or UWB in operation 615. According to various embodiments, the nearby device scanner 620-2 may display a pop-up for at least one discovered external electronic device in operation 617. According to various embodiments, when the user 600 clicks on the pop-up through the nearby device scanner 620-2 in operation 619, the nearby device scanner 620-2 may determine a device to be commissioned based on the onboarding information (e.g., vendorid and/or productid) about the IoT device 610 and/or at least one external electronic device in operation 621. According to various embodiments, the nearby device scanner 620-2 may obtain the onboarding information (e.g., vendorid and/or productid) about the IoT device 610 based on the device discovery result and the commissioning payload received from the camera app 620-1 in operation 613.

Referring to case 1 of FIG. 6B, the nearby device scanner 620-2 may transmit an application request to be commissioned to the server 630 in operation 623. According to various embodiments, the application request to be commissioned may include at least one of device information (e.g., matter device: Philips Hue) about the IoT device 610, the manufacturer ID (e.g., vendorid: 0x0010) of the IoT device 610, and the unique ID (e.g., productid: 0x0011) granted to the IoT device 610. According to various embodiments, the server 630 may transmit a response message including the priority app list to the nearby device scanner 620-2 in operation 625. According to various embodiments, the priority app list may include priority information about applications, information scheme information for each application, or package information. According to various embodiments, the nearby device scanner 620-2 may check package exit for the first application 640 in operation 627. According to various embodiments, the nearby device scanner 620-2 may execute the first application 640 in operation 629.

Referring to case 2 of FIG. 6B, the nearby device scanner 620-2 may transmit an application request to be commissioned to the server 630 in operation 631. According to various embodiments, the application request to be commissioned may include at least one of device information (e.g., matter device: Philips Hue) about the IoT device 610, the manufacturer ID (e.g., vendorid: 0x0010) of the IoT device 610, and the unique ID (e.g., productid: 0x0011) granted to the IoT device 610. According to various embodiments, the server 630 may transmit a response message including the priority app list to the nearby device scanner 620-2 in operation 633. According to various embodiments, the priority app list may include priority information about applications, information scheme information for each application, or package information. According to various embodiments, the nearby device scanner 620-2 may check package exit for the first application 640 in operation 635. According to various embodiments, the nearby device scanner 620-2 may check package exit for the second application 650 in operation 637. According to various embodiments, the nearby device scanner 620-2 may execute the second application 650 in operation 639.

Referring to FIG. 6C, the nearby device scanner 620-2 may transmit an application request to be commissioned to the server 630 in operation 641. According to various embodiments, the application request to be commissioned may include at least one of device information (e.g., matter device: Philips Hue) about the IoT device 610, the manufacturer ID (e.g., vendorid: 0x0010) of the IoT device 610, and the unique ID (e.g., productid: 0x0011) granted to the IoT device 610. According to various embodiments, the server 630 may transmit a response message including the priority app list to the nearby device scanner 620-2 in operation 643. According to various embodiments, the priority app list may include priority information about applications, information scheme information for each application, or package information. According to various embodiments, the nearby device scanner 620-2 may check package exit for the first application 640 in operation 645. According to various embodiments, the nearby device scanner 620-2 may check package exit for the third application 660 in operation 647). According to various embodiments, the nearby device scanner 620-2 may execute the third application 660 in operation 649.

Figure 7:
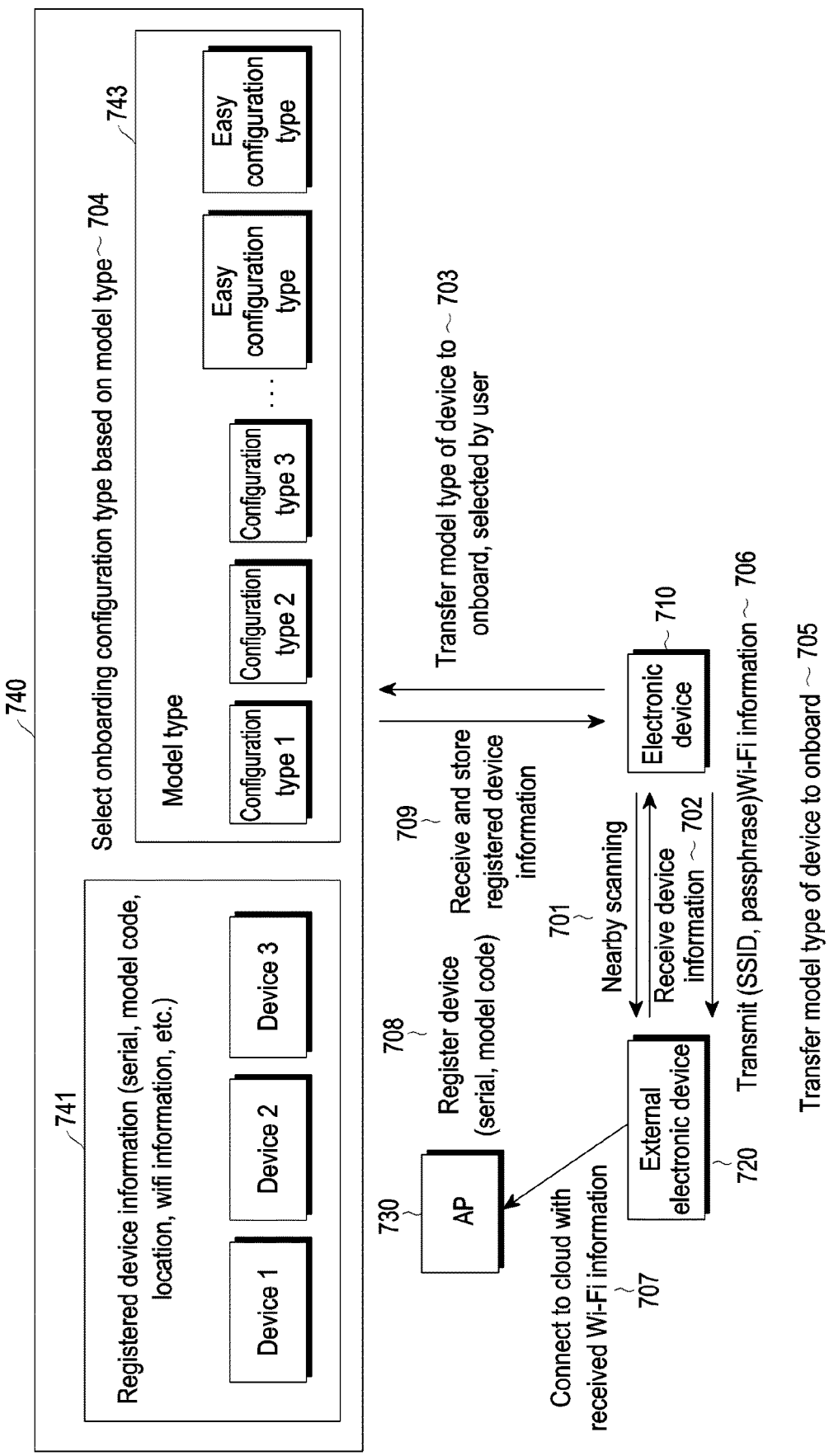
FIG. 7 is a view illustrating operations of an electronic device and a server according to an embodiment of the disclosure.

FIG. 7 is a view illustrating operations of an electronic device and a server according to an embodiment of the disclosure.

Referring to FIG. 7, a system may include an electronic device 710, an external electronic device 720, an AP 730, and a server 740. According to various embodiments, the electronic device 710 may be implemented as the electronic device 101 of FIG. 1, the electronic device 310 of FIG. 3, the electronic device 410 of FIG. 4, the electronic device 510 of FIG. 5, or the electronic device 610 of FIGS. 6A to 6C. According to various embodiments, the external electronic device 720 may be implemented as each of the electronic devices 102 and 104 of FIG. 1, the cloud-connected devices 330 of FIG. 3, or the cloud-connected devices 430 of FIG. 4. According to various embodiments, the server 740 may be implemented as the server 108 of FIG. 1, the cloud 320 of FIG. 3, the cloud 420, 460, or 470 of FIG. 4, the server 520 of FIG. 5, or the server 630 of FIGS. 6A to 6C.

According to various embodiments, the electronic device 710 may scan an external electronic device 720 positioned nearby in operation 701. According to various embodiments, the external electronic device 720 may receive device information about the electronic device 710 in operation 702. According to various embodiments, the electronic device 710 may receive device information about the external electronic device 720. According to various embodiments, the electronic device 710 may transfer the model type of the device model type to onboard, selected by the user to the server 740 in operation 703. According to various embodiments, the server 740 may store or update the registered device information 741. According to various embodiments, the registered device information 741 may include at least one of serial, model code, location, or Wi-Fi information about each of at least one external electronic device. According to various embodiments, the server 740 may select an onboarding configuration type based on the model type 743 in operation 704. According to various embodiments, the onboarding configuration type may mean the type of the user interface (UI) displayed to the user when onboarding (or registering) at least one external electronic device to the cloud (or server). According to various embodiments, the onboarding configuration type may include "configuration type 1", "configuration type 2", "configuration type 3", "easy configuration type 1", or "easy configuration type 2". For example, "configuration type 1" may be a UI type that requires a user input for the device type and the device model name. For example, "easy configuration type 1" may be a UI type in which contents received from the user are deleted as much as possible and may be a UI type that requires only the user input for the device type.

According to various embodiments, the electronic device 710 may transfer the model type of the device to onboard to the external electronic device 720 in operation 705. According to various embodiments, the electronic device 710 may transfer the Wi-Fi information (e.g., SSID, passphrase) of the AP 730 to the external electronic device 720 in operation 706. According to various embodiments, the external electronic device 720 may be connected to the cloud through the AP 730 using the received Wi-Fi information in operation 707. According to various embodiments, the external electronic device 720 may be connected to the network through the AP 730 to communicate with the server 740 in operation 708. According to various embodiments, the external electronic device 720 may communicate with the server 740 so that the serial and model code for the external electronic device 720 are registered with the server 740 in operation 708. According to various embodiments, the server 740 may register the serial and model code for the external electronic device 720 in the registered device information 741. According to various embodiments, the electronic device 710 may receive registered device information 741 including the serial and the model code for the external electronic device 720 from the server 740 and store it in operation 709.

Figure 8:
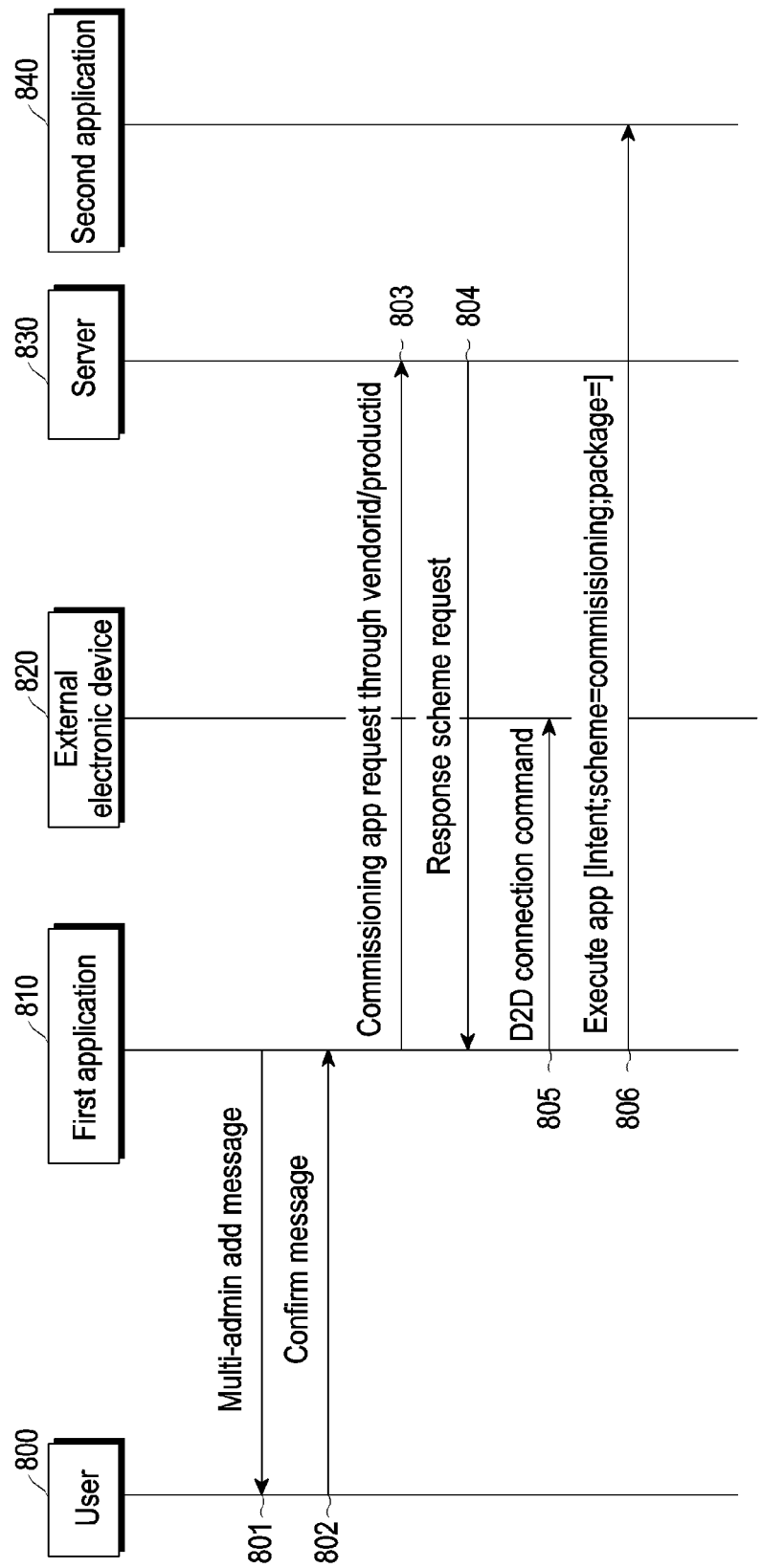
FIG. 8 is a flowchart illustrating a process of triggering execution of a second application on a first application and updating an administration authority on the second application according to an embodiment of the disclosure.

FIG. 8 is a flowchart illustrating a process of triggering execution of a second application on a first application and updating an administration authority on the second application according to an embodiment of the disclosure.

Referring to FIG. 8, a system may include a first application 810, an external electronic device 820, a server 830, and/or a second application 840. According to various embodiments, the first application 810 may perform the same or substantially the same function as the application 515 of FIG. 5 or the first application 640 of FIGS. 6A to 6C. According to various embodiments, the first application 810 may be installed and implemented on the electronic device 101 of FIG. 1, the electronic device 310 of FIG. 3, the electronic device 410 of FIG. 4, the electronic device 510 of FIG. 5, the electronic device 620 of FIGS. 6A to 6C, or the electronic device 710 of FIG. 7. According to various embodiments, the external electronic device 820 may be implemented as the electronic devices 102 and 104 of FIG. 1, the cloud-connected devices 330 of FIG. 3, the cloud-connected devices 430 of FIG. 4, or the external electronic device 720 of FIG. 7. According to various embodiments, the server 830 may perform the same or substantially the same function as the server 108 of FIG. 1, the cloud 320 of FIG. 3, the clouds 420, 460, and 470 of FIG. 4, the server 520 of FIG. 5, or the server 630 of FIGS. 6A to 6C. According to various embodiments, the second application 840 may perform the same or substantially the same function as the second application 650 or third application 660 of FIGS. 6A to 6C.

According to various embodiments, the first application 810 may provide (or display), to the user 800, a multi-admin additional message to allow a plurality of applications to have control authority over the external electronic device 820 in operation 801, and the user 800 may display a confirm message indicating acceptance of the multi-admin additional message on the first application 810 in operation 802. According to various embodiments, the first application 810 may request a commissioning application from the server 830 based on onboarding information (vendorid, productid) about the external electronic device 820 in operation 803. According to various embodiments, the server 830 may transmit a response scheme request to the first application 810 in operation 804.

According to various embodiments, when the external electronic device 820 is onboarded (or registered) to the server 830 corresponding to the first application 810, the external electronic device 820 may later be controlled not to perform a device-to-device (D2D) connection. According to various embodiments, in order for the external electronic device 820 to be additionally onboarded (or registered) to the server corresponding to the second application 840, the external electronic device 820 may be controlled to perform D2D connection again. According to various embodiments, in order for the external electronic device 820 to be additionally onboarded (or registered) to the server corresponding to the second application 840, the first application 810 may transmit a D2D connection command (e.g., open pairing window) to the external electronic device 820 to allow the external electronic device 820 to perform D2D connection in operation 805. According to various embodiments, the external electronic device 820 receiving the D2D connection command (e.g., open pairing window) may change the device state so that the D2D connection may be performed. According to various embodiments, the external electronic device 820 receiving the D2D connection command (e.g., open pairing window) may switch to a pairing mode in which D2D connection may be performed. According to various embodiments, the external electronic device 820 may identify that a multi-admin may be set for controlling the external electronic device 820 and may execute a pairing mode for running the second application 840.

According to various embodiments, the first application 810 may trigger the second application 840 to be executed in operation 806. According to various embodiments, the second application 840 may obtain the administration authority for the external electronic device 820 or directly update the administration authority for the external electronic device 820. According to various embodiments, the external electronic device 820 may be onboarded (or registered) to the server 830 through the first application 810 and, then, in a case in which a second administration authority (2nd admin) is set in the external electronic device 820, the pairing mode may be executed to allow the external electronic device 820 to be onboarded (or registered) to another server. According to various embodiments, the external electronic device 820 may request vendorid, productid, and/or onboarding app information (e.g., information about the first application 810) from the server 830 and may execute the second application 840 based on the received information.

Figure 9:
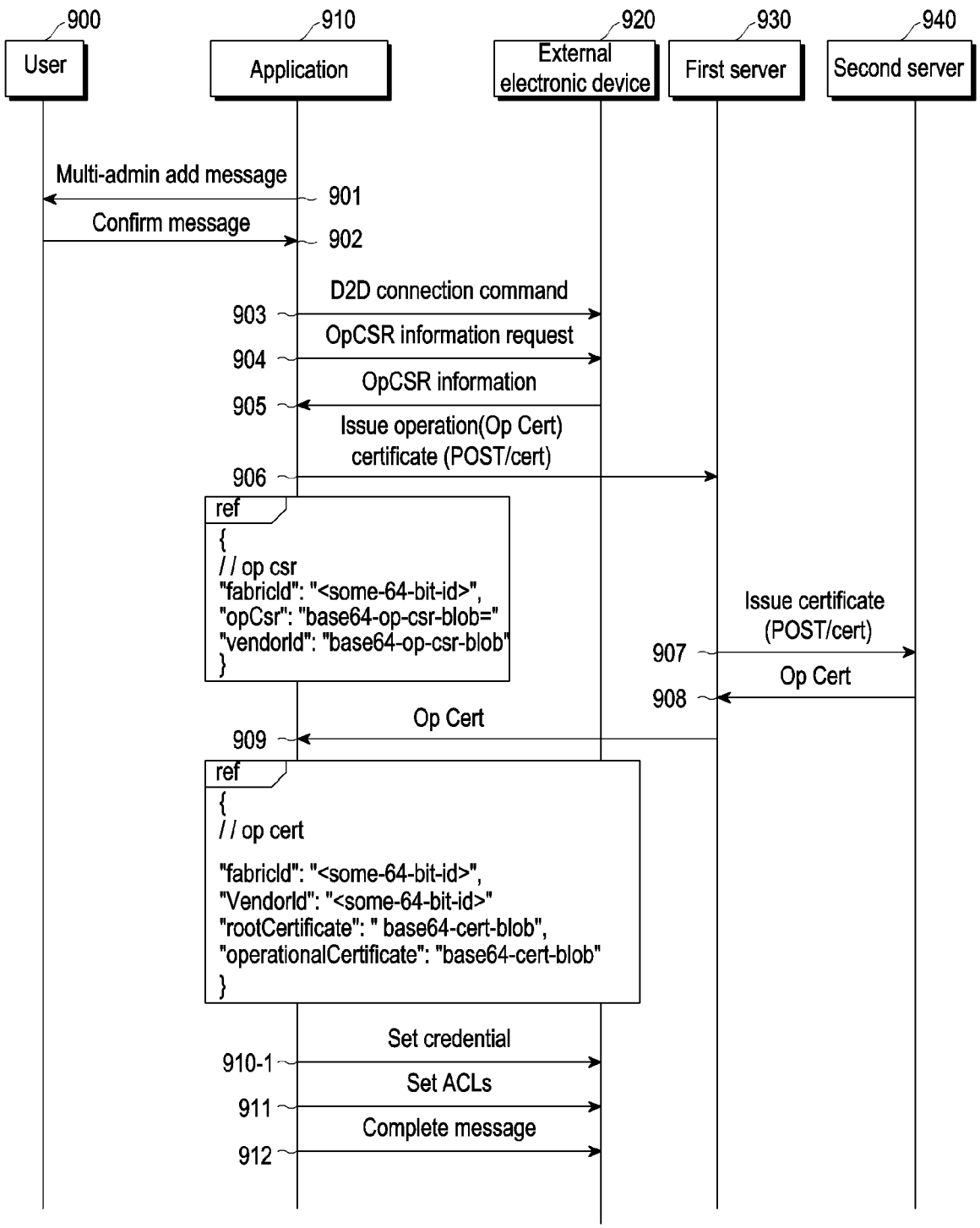
FIG. 9 is a flowchart illustrating a process in which a first application grants an administration authority for a second application according to an embodiment of the disclosure.

FIG. 9 is a flowchart illustrating a process in which an application grants an administration authority for another application according to an embodiment of the disclosure.

Referring to FIG. 9, a system may include an application 910, an external electronic device 920, a first server 930, and/or a second server 940. According to various embodiments, the application 910 may perform the same or substantially the same function as the application 515 of FIG. 5 or the first application 640 of FIGS. 6A to 6C. According to various embodiments, the application 910 may be installed and implemented on the electronic device 101 of FIG. 1, the electronic device 310 of FIG. 3, the electronic device 410 of FIG. 4, the electronic device 510 of FIG. 5, the electronic device 610 of FIGS. 6A to 6C, or the electronic device 710 of FIG. 7. According to various embodiments, the external electronic device 920 may be implemented as the electronic devices 102 and 104 of FIG. 1, the cloud-connected devices 330 of FIG. 3, the cloud-connected devices 430 of FIG. 4, or the external electronic device 720 of FIG. 7. According to various embodiments, the first server 930 may perform the same or substantially the same function as the server 108 of FIG. 1, the cloud 320 of FIG. 3, the clouds 420, 460, and 470 of FIG. 4, the server 520 of FIG. 5, or the server 630 of FIGS. 6A to 6C. According to various embodiments, the second server 940 may mean a server corresponding to the second application 650 or the third application 660 of FIGS. 6A to 6C.

According to various embodiments, the application 910 may provide (or display), to the user 900, a multi-admin additional message to allow a plurality of applications to have control authority over the external electronic device 920 in operation 901, and the user 900 may display a confirm message indicating acceptance of the multi-admin additional message on the application 910 in operation 902.

According to various embodiments, when the external electronic device 920 is onboarded (or registered) to the first server 930, the external electronic device 920 may be controlled not to perform D2D connection. According to various embodiments, in order for the external electronic device 920 to be additionally onboarded (or registered) to the second server 940, the external electronic device 920 may be controlled to perform D2D connection again. According to various embodiments, in order for the external electronic device 920 to be additionally onboarded (or registered) to the second server 940, the application 910 may transmit a D2D connection command (e.g., open pairing window) to the external electronic device 920 to allow the external electronic device 920 to perform D2D connection in operation 903. According to various embodiments, the external electronic device 920 receiving the D2D connection command (e.g., open pairing window) may change the device state so that the D2D connection may be performed. According to various embodiments, the external electronic device 920 receiving the D2D connection command (e.g., open pairing window) may switch to a pairing mode in which D2D connection may be performed. According to various embodiments, the external electronic device 920 may identify that a multi-admin may be set for controlling the external electronic device 920 and may execute a pairing mode for the external electronic device 920 to be onboarded (or registered) to the second server 940.

According to various embodiments, the application 910 may request operation CSR (OpCSR) information from the external electronic device 920 in operation 904 and may receive OpCSR information from the external electronic device 920 in operation 905. According to various embodiments, the application 910 may issue an operational certificate (Op Cert) (e.g., POST/cert) to the first server 930 in operation 906.

According to various embodiments, an example of the operation CSR (OpCSR) is as follows.

```
{
    // op csr
    "fabricId": "<some-64-bit-id>",
    "opCsr": "base64-op-csr-blob"
    "vendorId": "base64-op-csr-blob"
}
```

According to various embodiments, an example of the operational certificate (Op Cert) is as follows.

```
{
    // op cert
    "fabricId": "<some-64-bit-id>",
    "VendorId":"<some-64-bit-id>"
    "rootCertificate": "base64-cert-blob",
    "operationalCertificate": "base64-cert-blob"
}
```

According to various embodiments, the first server 930 may issue an operational certificate (Op Cert) (e.g., POST/cert) to the second server 940 in operation 907. According to various embodiments, the second server 940 may return the operational certificate (Op Cert) to the first server 930 in operation 908. According to various embodiments, the first server 930 may return the operational certificate (Op Cert) to the application 910 in operation 909. According to various embodiments, the application 910 may set credentials to the external electronic device 920 in operation 910-1 and set access control lists (ACLs) in operation 911. According to various embodiments, the application 910 may transmit a complete message to the external electronic device 920 in operation 912.

According to various embodiments, the application 910 may directly grant an administration authority to the external electronic device 920 to another application corresponding to the second server 940. According to various embodiments, the application 910 may control (or command) the external electronic device 920 to execute the pairing mode so that a second administration authority (2nd admin) is set (or updated) in the external electronic device 920. According to various embodiments, the application 910 may request certificates from the first server 930 based on the manufacturer ID (vendorid) of the external electronic device 920. According to various embodiments, the first server 930 may request the certificate of the application mapped to the manufacturer ID (vendorid) of the external electronic device 920. According to various embodiments, the application 910 may receive the certificate of the application mapped to the manufacturer ID (vendorid) of the external electronic device 920 and may set (or update) the second administration authority (2nd admin) for the external electronic device 920.

According to various embodiments, in the case of the external electronic device 920 connected to the hub (e.g., the hub 440 of FIG. 4), the user 900 may control the external electronic device 920 by directly controlling the hub through the application 910 (e.g., if the location is shared by the member invite function). According to various embodiments, in the case of the external electronic device 920 not connected to the hub, the external electronic device 920 may be controlled through the corresponding application only when an application to which an administration authority is added is connected.

According to various embodiments, the application 910 may manage a plurality of electronic devices as a group and may simultaneously control the group. According to various embodiments, the application 910 may provide location information and/or the same group ID to the plurality of electronic devices set (or invited) as a group. According to various embodiments, the application 910 may share the group ID to update the administration authority for the external electronic device 920 included in the group. According to various embodiments, the application 910 may transmit a group invite message to the external electronic device 920. When the external electronic device 920 accepts the group invitation, the application 910 may obtain the group ID of the external electronic device 920 from the first server 930. According to various embodiments, the application 910 may transmit a pairing command to the external electronic device 920 and may update the group ID for the external electronic device 920.

Figure 10:
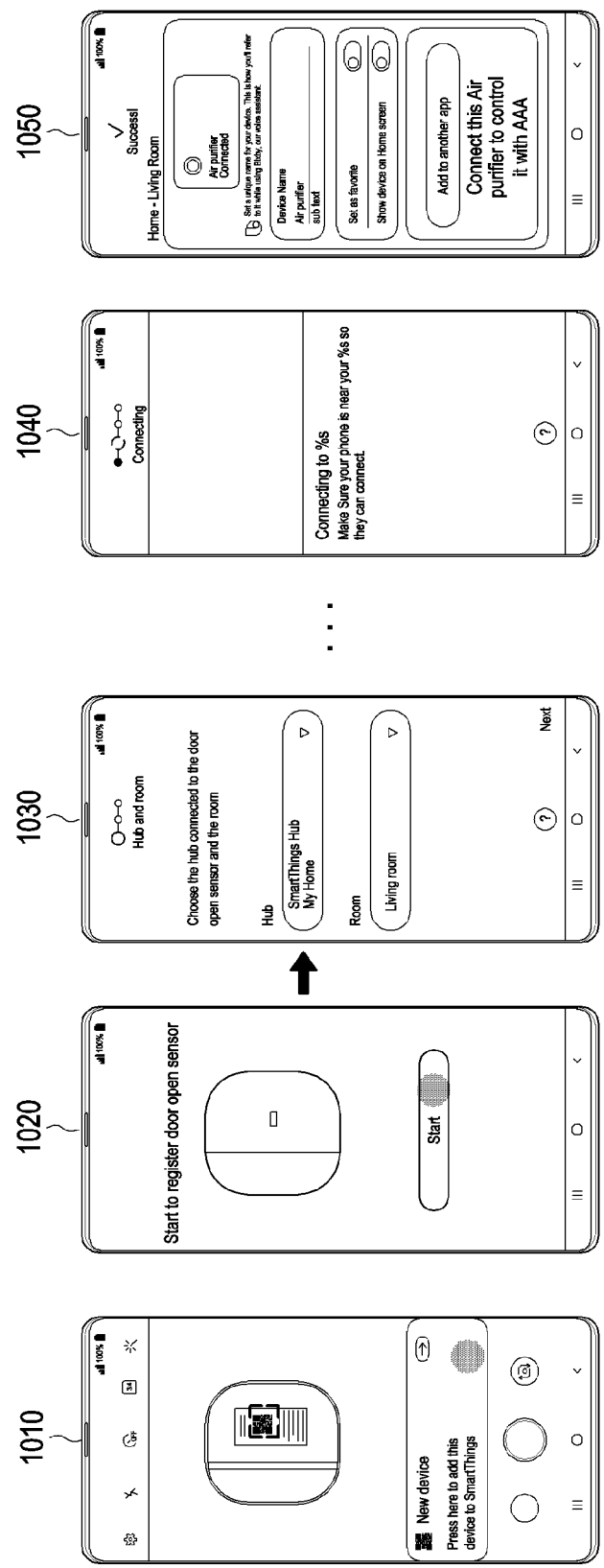
FIG. 10 is a view illustrating an example of a user interface for adding an administration authority to a second application after onboarding through a first application according to an embodiment of the disclosure.

FIG. 10 is a view illustrating an example of a user interface for adding an administration authority to a second application after onboarding through a first application according to an embodiment of the disclosure.

Referring to FIG. 10, an electronic device (e.g., the electronic device 101 of FIG. 1, the electronic device 310 of FIG. 3, the electronic device 410 of FIG. 4, the electronic device 510 of FIG. 5, the electronic device 610 of FIGS. 6A to 6C, the electronic device 710 of FIG. 7, the electronic device 820 of FIG. 8, or the electronic device 920 of FIG. 9) may recognize the QR code of the external electronic device (e.g., door open sensor) through the camera (e.g., the camera module 180 of FIG. 1 or the camera app 511 of FIG. 5) included in the electronic device. According to various embodiments, the electronic device 510 may provide a user interface (e.g., "Press here to add this device to SmartThings") for the recognized external electronic device to be onboarded (or registered) to the server through the first application (e.g., the application 515 of FIG. 5, the first application 640 of FIGS. 6A to 6C, the first application 810 of FIG. 8, or the first application 910 of FIG. 9) (1010). According to various embodiments, the electronic device may provide a user interface for starting an onboarding (or registration) procedure of the external electronic device (e.g., a door open sensor) (1020). According to various embodiments, the electronic device 510 may provide a user interface to set information regarding the location (e.g., living room) of the external electronic device (e.g., door open sensor) and the hub (e.g., the hub 440 of FIG. 4) connected to the external electronic device (e.g., door open sensor) (1030). According to various embodiments, the electronic device may perform an onboarding (or registration) procedure of the external electronic device (e.g., door open sensor) (1040). According to various embodiments, the electronic device 510 may provide a user interface for adding an administration authority to the second application (e.g., the second application 650 or third application 660 of FIGS. 6A to 6C, the second application 840 of FIG. 8, or the second server 940 of FIG. 9) to be able to control the external electronic device (e.g., air purifier) after completing the onboarding (or registration) for the external electronic device (e.g., door open sensor) through the first application (1050). According to various embodiments, the electronic device may provide a user interface for automatically or manually guiding the user to the second application capable of additional onboarding for the external electronic device (e.g., an air purifier).

Figure 11:
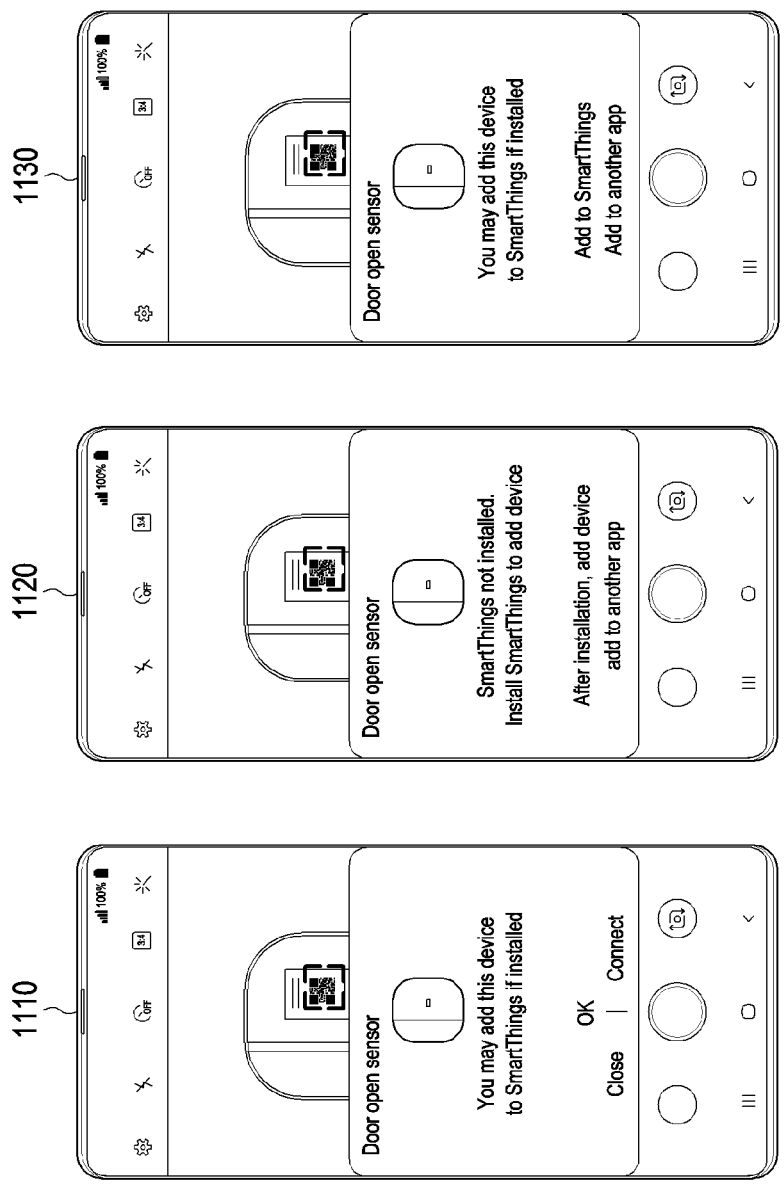
FIG. 11 is a view illustrating an example of a user interface for adding a second application depending on app priority and whether a first application is installed after recognizing QR on camera according to an embodiment of the disclosure.

FIG. 11 is a view illustrating an example of a user interface for adding a second application depending on app priority and whether a first application is installed after recognizing QR on camera according to an embodiment of the disclosure;

Referring to FIG. 11, an electronic device (e.g., the electronic device 101 of FIG. 1, the electronic device 310 of FIG. 3, the electronic device 410 of FIG. 4, the electronic device 510 of FIG. 5, the electronic device 610 of FIGS. 6A to 6C, the electronic device 710 of FIG. 7, the electronic device 820 of FIG. 8, or the electronic device 920 of FIG. 9) may recognize the QR code of the external electronic device (e.g., door open sensor) through the camera (e.g., the camera module 180 of FIG. 1 or the camera app 511 of FIG. 5) included in the electronic device. According to various embodiments, the electronic device may provide a user interface for onboarding (or registering) the external electronic device (e.g., door open sensor) through the first application (e.g., the application 515 of FIG. 5, the first application 640 of FIGS. 6A to 6C, the first application 810 of FIG. 8, or the first application of FIG. 9). According to various embodiments, the electronic device may provide a different user interface (1110) depending on whether the first application is installed on the electronic device. According to various embodiments, when the first application is not installed on the electronic device, the electronic device 510 may provide a user interface for onboarding (or registering) the external electronic device (e.g., door open sensor) after installing the first application or onboarding (or registering) the external electronic device (e.g., door open sensor), to the second application without installing the first application (1120). According to various embodiments, when the first application is installed on the electronic device, the electronic device 510 may provide a user interface for onboarding (or registering) the external electronic device (e.g., door open sensor) to the first application or onboarding (or registering) the external electronic device (e.g., door open sensor) to the second application (1130).

Figure 12:
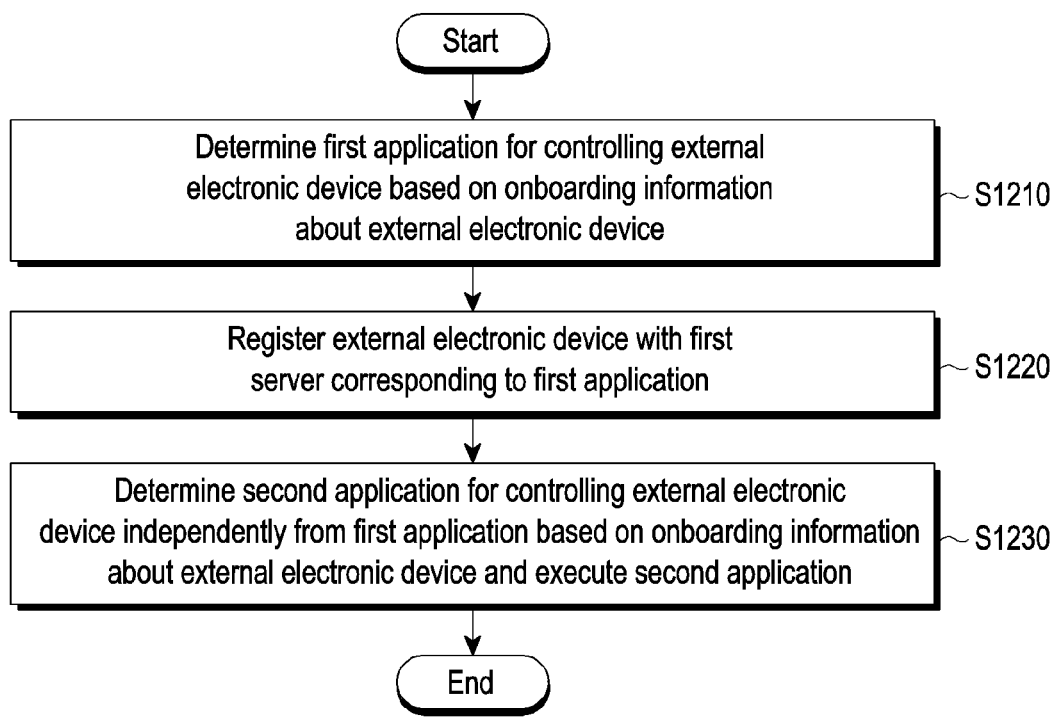
FIG. 12 is a view illustrating an operation method of an electronic device according to an embodiment of the disclosure.

FIG. 12 is a view illustrating an operation method of an electronic device according to an embodiment of the disclosure.

Referring to FIG. 12, an electronic device (e.g., the electronic device 101 of FIG. 1, the electronic device 310 of FIG. 3, the electronic device 410 of FIG. 4, the electronic device 510 of FIG. 5, the electronic device (610 of FIGS. 6A to 6C, the electronic device 710 of FIG. 7, the electronic device 820 of FIG. 8, or the electronic device 920 of FIG. 9) may determine a first application for controlling an external electronic device based on onboarding information about the external electronic device at operation S1210. According to various embodiments, the electronic device may register the external electronic device with the first server corresponding to the first application at operation S1220. According to various embodiments, the electronic device may determine a second application for controlling the external electronic device independently of the first application based on the onboarding information about the external electronic device and may execute the second application at operation S1230. According to various embodiments, the electronic device may register the external electronic device with the second server corresponding to the second application.

According to various embodiments, the electronic device may grant multi-administration authority to the second application in response to a user input so that the second application may control the external electronic device. According to various embodiments, the onboarding information about the external electronic device may include a vendor ID (vendorid) of the external electronic device and a unique ID (productid) granted to the external electronic device. According to various embodiments, the electronic device may determine the first application based on the onboarding information about the external electronic device, information about an operating system installed on the electronic device, and/or information about an application installed on the electronic device. According to various embodiments, the electronic device may receive a certificate mapped to the manufacturer ID of the external electronic device from the first server and may determine the second application based on the certificate. According to various embodiments, the electronic device may receive priority information about applications that may be executed on the electronic device from the first server and may determine the second application based on the onboarding information about the external electronic device and the priority information about the application. According to various embodiments, the electronic device may further include a camera for recognizing the QR code of the external electronic device and a nearby device scanner for obtaining the onboarding information about the external electronic device based on the detection information about the external electronic device and the QR code-based information.

Figure 13:
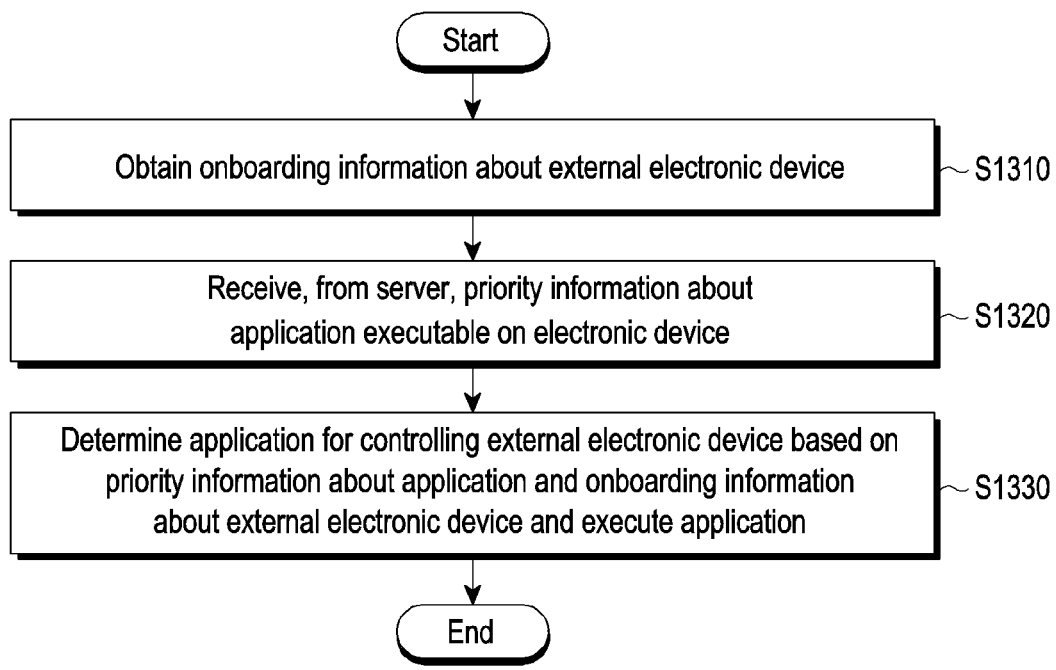
FIG. 13 is a view illustrating an operation method of an electronic device according to an embodiment of the disclosure.

FIG. 13 is a view illustrating an operation method of an electronic device according to an embodiment of the disclosure.

Referring to FIG. 13, an electronic device (e.g., the electronic device 101 of FIG. 1, the electronic device 310 of FIG. 3, the electronic device 410 of FIG. 4, the electronic device 510 of FIG. 5, the electronic device 610 of FIGS. 6A to 6C, the electronic device 710 of FIG. 7, the electronic device 820 of FIG. 8, or the electronic device 920 of FIG. 9) may obtain onboarding information about an external electronic device at operation S1310. According to various embodiments, the electronic device may receive priority information about applications that may be executed on the electronic device from the server at operation S1320. According to various embodiments, the electronic device may determine an application for controlling the external electronic device based on the onboarding information about the external electronic device and the priority information about the application and may execute the application at operation S1330.

Figure 14:
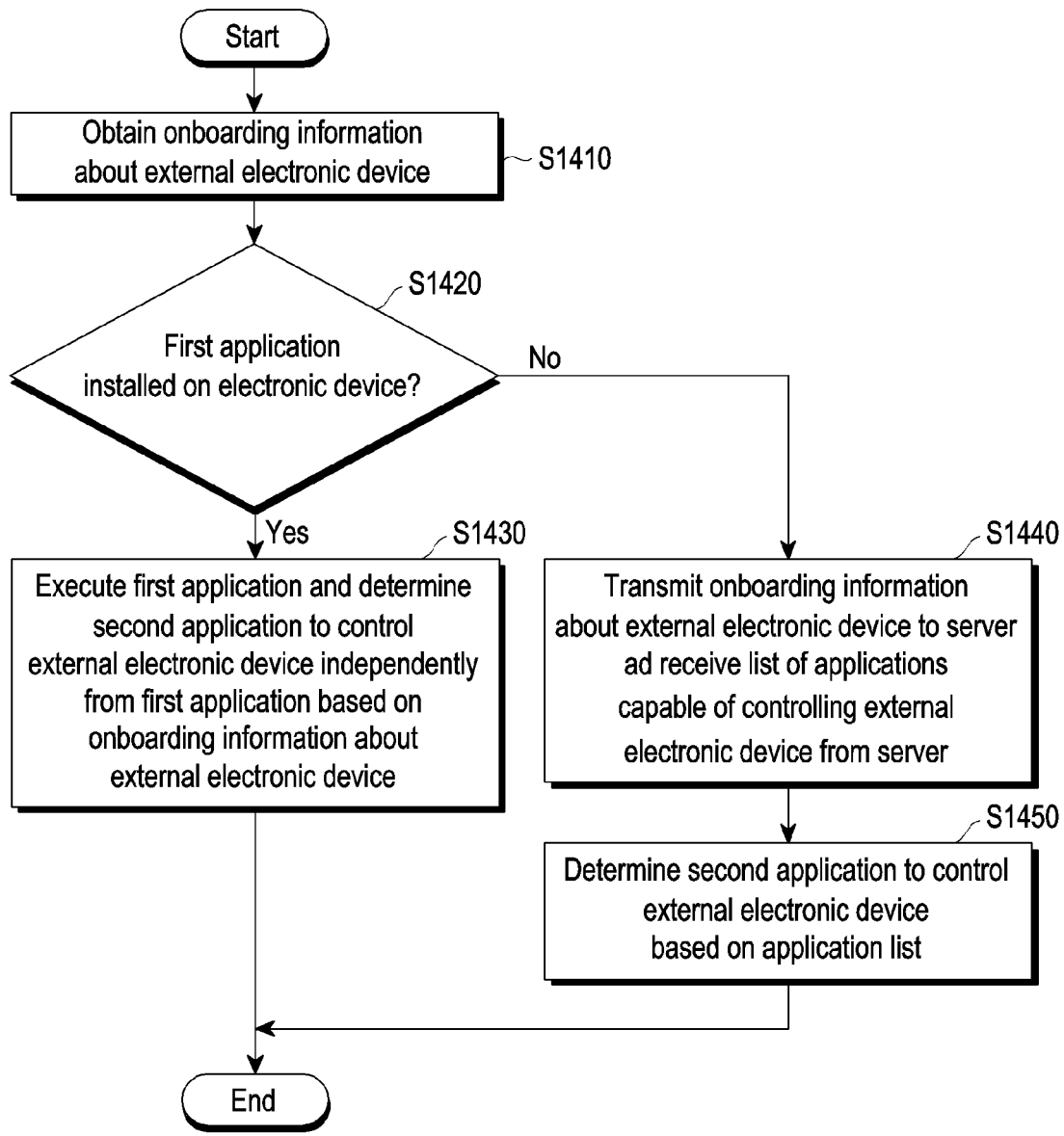
FIG. 14 is a view illustrating an operation method of an electronic device according to an embodiment of the disclosure.

FIG. 14 is a view illustrating an operation method of an electronic device according to an embodiment of the disclosure.

Referring to FIG. 14, an electronic device (e.g., the electronic device 101 of FIG. 1, the electronic device 310 of FIG. 3, the electronic device 410 of FIG. 4, the electronic device 510 of FIG. 5, the electronic device 610 of FIGS. 6A to 6C, the electronic device 710 of FIG. 7, the electronic device 820 of FIG. 8, or the electronic device 920 of FIG. 9) may obtain onboarding information about an external electronic device at operation S1410.

According to various embodiments, the electronic device may identify whether a first application is installed on the electronic device at operation S1420.

According to various embodiments, when the first application is installed on the electronic device at operation S1420-Yes, the electronic device may execute the first application and determine a second application to control the external electronic device independently from the first application based on the onboarding information about the external electronic device at operation S1430. According to various embodiments, the second application for controlling the external electronic device independently of the first application may be determined based on at least one of the manufacturer ID (vendorid) of the external electronic device and the unique ID (productid) granted to the external electronic device.

According to various embodiments, when the first application is not installed on the electronic device at operation S1420-No, the electronic device may transmit onboarding information about the external electronic device to the server and may receive a list of applications capable of controlling the external electronic device from the server at operation S1440. According to various embodiments, the electronic device may determine the second application to control the external electronic device based on the application list at operation S1450.

According to various embodiments, an electronic device (e.g., the electronic device 101 of FIG. 1, the electronic device 310 of FIG. 3, the electronic device 410 of FIG. 4, the electronic device 510 of FIG. 5, the electronic device 610 of FIGS. 6A to 6C, the electronic device 710 of FIG. 7, the electronic device 820 of FIG. 8, or the electronic device 920 of FIG. 9) includes a communication module (e.g., the communication module 190 of FIG. 1) and at least one processor (e.g., the processor 120 of FIG. 1) connected to the communication module. According to various embodiments, the at least one processor may determine a first application (e.g., the application 515 of FIG. 5, the first application 640 of FIGS. 6A to 6C, the first application 810 of FIG. 8, or the application 910 of FIG. 9) for controlling an external electronic device (e.g., the electronic device 102 or 104 of FIG. 1, the cloud-connected devices 330 of FIG. 3, the cloud-connected devices 430 of FIG. 4, the external electronic device 720 of FIG. 7, the external electronic device 820 of FIG. 8, or the external electronic device 920 of FIG. 9) based on onboarding information about the external electronic device and register the external electronic device with a first server (e.g., the server 630 of FIGS. 6A to 6C, the server 740 of FIG. 7, the server 830 of FIG. 8, or the first server 930 of FIG. 9) corresponding to the first application. According to various embodiments, the at least one processor may determine a second application (e.g., the second application 650 of FIGS. 6A to 6C or the second application 840 of FIG. 8) for controlling the external electronic device independently from the first application based on the onboarding information about the external electronic device and execute the second application. According to various embodiments, the at least one processor may control to register the external electronic device with a second server corresponding to the second application. According to various embodiments, the second application may be granted a multi-administration authority in response to a user input to allow the second application to control the external electronic device. According to various embodiments, the onboarding information about the external electronic device may include a vendor ID (vendorid) of the external electronic device and a unique ID (productid) granted to the external electronic device.

According to various embodiments, the at least one processor may determine the first application based on the onboarding information about the external electronic device, information about an operating system installed on the electronic device, and information about an application installed on the electronic device. According to various embodiments, the at least one processor may receive a certificate mapped to the manufacturer ID of the external electronic device from the first server and may determine the second application based on the certificate. According to various embodiments, the at least one processor may receive priority information about applications that may be executed on the electronic device from the first server and may determine the second application based on the onboarding information about the external electronic device and the priority information about the application. According to various embodiments, the electronic device may further include a camera for recognizing the QR code of the external electronic device and a nearby device scanner for obtaining the onboarding information about the external electronic device based on the detection information about the external electronic device and the QR code-based information.

According to various embodiments, the at least one processor may obtain onboarding information about the external electronic device and may receive priority information about applications executable on the electronic device from the server. According to various embodiments, the at least one processor may determine an application for controlling the external electronic device based on the onboarding information about the external electronic device and the priority information about the application and/or may execute the application.

According to various embodiments, the at least one processor may obtain onboarding information about the external electronic device and may identify whether the first application is installed on the electronic device. According to various embodiments, when the first application is installed on the electronic device, the at least one processor may execute the first application and determine a second application to control the external electronic device independently from the first application based on the onboarding information about the external electronic device. According to various embodiments, when the first application is not installed on the electronic device, the at least one processor may receive an application list for controlling the external electronic device from the server and may determine a second application to control the external electronic device based on the received application list. According to various embodiments, the second application may be granted a multi-administration authority in response to a user input to allow the second application to control the external electronic device.

What is claimed is:

1. An electronic device comprising:
   memory storing instructions;
   a communication circuit; and
   at least one processor connected to the communication circuit and the memory,
   wherein the instructions, when executed by the at least one processor, cause the electronic device to:
      determine a first application for controlling an external electronic device based on onboarding information of the external electronic device,
      determine a second application for controlling the external electronic device different from the first application based on the onboarding information of the external electronic device, and
      execute the second application, and
   wherein the second application is granted an administration authority for controlling the external electronic device after a user input.

2. The electronic device of claim 1, wherein the at least one processor is further configured to register the external electronic device with a second server corresponding to the second application.

3. The electronic device of claim 1, wherein the onboarding information of the external electronic device includes a manufacturer ID of the external electronic device and a unique ID granted to the external electronic device.

4. The electronic device of claim 3, wherein the at least one processor is further configured to determine the first application based on the onboarding information of the external electronic device, information on an operating system installed in the electronic device, and information on an application installed in the electronic device.

5. The electronic device of claim 3,
   wherein the at least one processor is further configured to receive, from a first server corresponding to the first application, a certificate mapped to the manufacturer ID of the external electronic device, and
   determine the second application further based on the certificate.

6. The electronic device of claim 3,
   wherein the at least one processor is further configured to receive, from a first server corresponding to the first application, priority information on an application executable in the electronic device, and
   determine the second application further based on the priority information on the application and the onboarding information of the external electronic device.

7. The electronic device of claim 1, further comprising:
   a camera configured to recognize a quick response (QR) code of the external electronic device; and
   a device scanner configured to obtain the onboarding information of the external electronic device based on detection information for the external electronic device and the QR code.

8. An electronic device comprising:
   memory storing instructions;
   a communication circuit; and
   at least one processor connected to the communication circuit and the memory,
   wherein the instructions, when executed by the at least one processor, cause the electronic device to:
      obtain onboarding information of an external electronic device,
      receive, from a server, priority information on an application executable in the electronic device,
      determine an application among a plurality of applications for controlling the external electronic device based on the priority information on the application and the onboarding information on the external electronic device, and
      execute the determined application, and
   wherein the plurality of applications are granted an administration authority for controlling the external electronic device after a user input.

9. The electronic device of claim 8, wherein the onboarding information of the external electronic device includes a manufacturer ID of the external electronic device and a unique ID granted to the external electronic device.

10. A method for operating an electronic device to determine an application for controlling an external electronic device, the method comprising:
    determining a first application for controlling the external electronic device based on onboarding information of the external electronic device;
    determining a second application for controlling the external electronic device different from the first application based on the onboarding information of the external electronic device; and
    executing the second application,
    wherein the second application is granted an administration authority for controlling the external electronic device after a user input.

11. The method of claim 10, further comprising registering the external electronic device with a second server corresponding to the second application.

12. The method of claim 10, wherein the onboarding information of the external electronic device includes a manufacturer ID of the external electronic device and a unique ID granted to the external electronic device.

13. A method for operating an electronic device to determine an application for controlling an external electronic device, the method comprising:
- obtaining onboarding information of the external electronic device;
- receiving, from a server, priority information on an application executable in the electronic device;
- determining an application among a plurality of applications for controlling the external electronic device based on the priority information on the application and the onboarding information of the external electronic device; and
- executing the determined application,
- wherein the plurality of applications are granted an administration authority for controlling the external electronic device after a user input.

* * * * *